United States Patent [19]

Chauvel et al.

[11] Patent Number: 4,768,157

[45] Date of Patent: Aug. 30, 1988

[54] VIDEO IMAGE PROCESSING SYSTEM

[75] Inventors: Gerard Chauvel, Cagnes/Mer; Frederic Boutaud, St. Laurent-du-Var, both of France

[73] Assignee: Texas Instruments Incorporated, Dallas, Tex.

[21] Appl. No.: 746,595

[22] Filed: Jun. 19, 1985

[30] Foreign Application Priority Data

Jun. 29, 1984 [FR] France ............................... 84 10376

[51] Int. Cl.[4] ........................ G06F 15/66; G06K 9/42; G09G 1/06

[52] U.S. Cl. .................................... 364/521; 340/727; 340/731

[58] Field of Search ............... 340/727, 731, 519, 521; 364/518, 522

[56] References Cited

U.S. PATENT DOCUMENTS

| | | | |
|---|---|---|---|
| 3,394,354 | 7/1968 | Senzig | 364/200 |
| 3,976,982 | 8/1976 | Eiselen | 340/727 |
| 4,090,174 | 5/1978 | Van Voorhis | 364/900 |
| 4,197,590 | 4/1980 | Sukonick et al. | 364/900 |
| 4,225,929 | 9/1980 | Ikeda | 364/521 |
| 4,271,476 | 6/1981 | Lotspiech | 340/727 |
| 4,357,671 | 11/1982 | Miller | 364/518 |
| 4,447,882 | 5/1984 | Walz | 364/521 |
| 4,477,802 | 10/1984 | Walter et al. | 340/727 |
| 4,486,745 | 12/1984 | Konno | 340/727 |
| 4,559,611 | 12/1985 | Ostapko | 340/727 |
| 4,570,158 | 2/1986 | Bleich et al. | 340/727 |
| 4,590,465 | 5/1986 | Fuchs | 340/727 |
| 4,631,751 | 12/1986 | Anderson et al. | 340/731 X |
| 4,635,212 | 1/1987 | Hatazawa | 364/518 |
| 4,636,783 | 1/1987 | Omachi | 340/727 |
| 4,644,503 | 2/1987 | Bantz et al. | 364/521 X |

OTHER PUBLICATIONS

Eiselen: Raster Memory Scannable by Row or by Column, IBM Technical Disclosure Bulletin, vol. 14, No. 7, Dec. 1971.

*Primary Examiner*—Felix D. Gruber

*Attorney, Agent, or Firm*—Gary C. Honeycutt; N. Rhys Merrett; Melvin Sharp

[57] ABSTRACT

The point processor includes a network of memory cells (33) addressable into rows and columns (direction X and Y). A control unit (42) effects reading and writing into the network according to parameters established in advance. This processor is integrated into a video display system for various image manipulations.

5 Claims, 28 Drawing Sheets

VIDEO IMAGE PROCESSING SYSTEM

This application is related to application Ser. No. 746,594 and to application Ser. No. 746,422, both filed June 19, 1985, and both assigned to Texas Instruments Incorporated.

This invention relates to a processor for video image points to be displayed on a screen by line by line and point by point sweeping.

BACKGROUND OF THE INVENTION

Image manipulations, such as, for example, incrustation, rotation, or color change, at the present time are effected by programming the central processing unit which usually includes a modern video display system which displays the image on the screen by frame sweeping.

The object of this invention is to obtain these manipulations with a minimum of programming and with a very substantial reduction in the required memory size.

SUMMARY OF THE INVENTION

According to the invention, a processor is characterized in that it includes a network of memorization cells arranged in rows and columns and containing at least a portion of the image information to be processed, this memorization network being addressable in two perpendicular directions defined by columns and rows, the processor also including input/output means through which the processor communicates with the exterior in order to receive said image information, and control means which, as a function of the processing to be effected on the information, is adapted selectively to address, in one or the other direction, the memorization cells of said network.

The invention will be more fully described in connection with the description which follows and the accompanying drawings, which are given only as an example.

DETAILED DESCRIPTION OF THE PREFERRED EMBODIMENT

Figure 1:
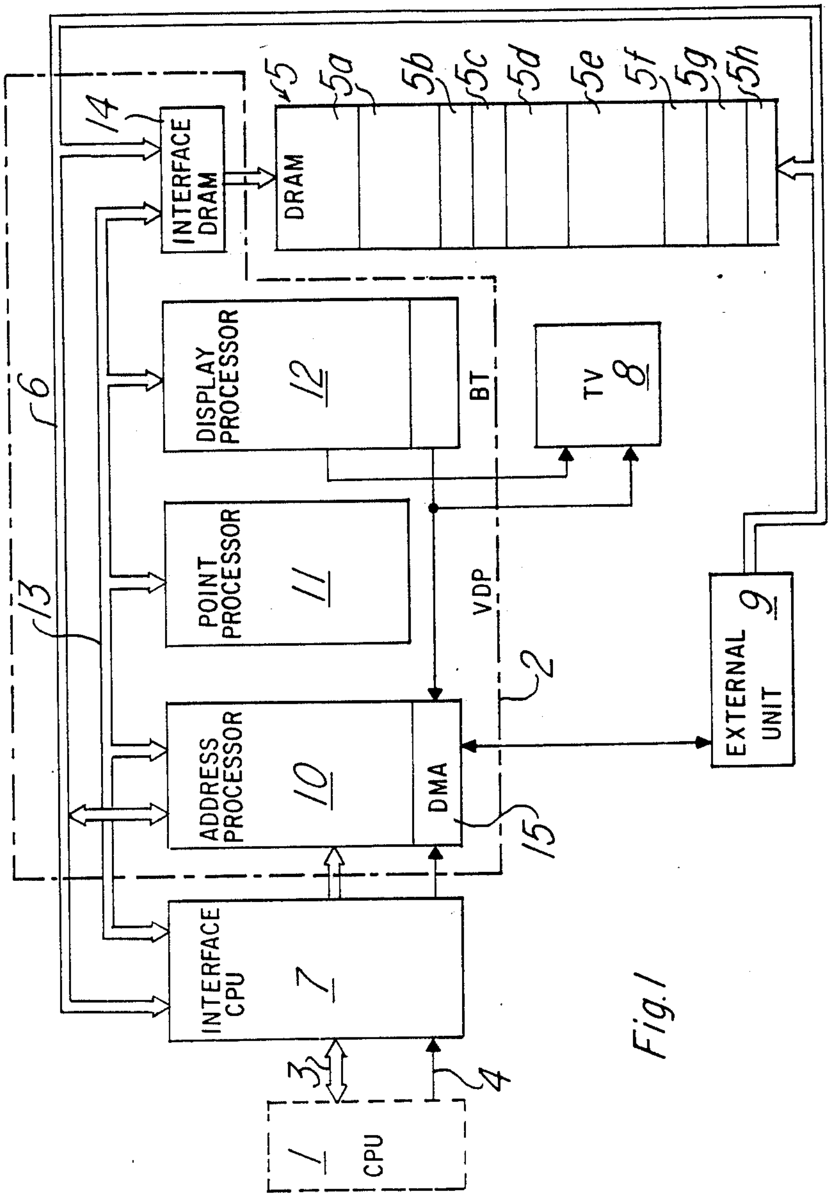
FIG. 1 is a general schematic of a video display system incorporating a point processor according to this invention.

FIG. 1 shows a much simplified schematic of a display system using the point processor according to the invention. This system includes several units, namely:

A central processing unit 1, CPU, which controls all the operations of the system by means of a program stored in the CPU's memory.

A video display processor 2, VDP, which communicates with the CPU by bus 3 and control line 4, the address and data information circulation on bus 3 being time multiplexed according to the process described in the portions of copending application Ser. No. 583,072 discussing FIGS. 1 through 11*b* therein, filed Feb. 23, 1984 and now U.S. Pat. No. 4,684,938 issued Aug. 4, 1987 by the instant applicant.

A dynamic random access memory 5, DRAM, which communicates with the other units of the system by bus 6 in time sharing, this bus being connected to CPU 1 over interface 7.

A display unit 8 which can be a conventional television or a conventional monitor, this unit being adapted to display the visual information processed in the system according to the invention by means of, for example, a cathode ray tube.

An external channel 9, by means of which the inventive system communicates with an external information source which might be, for example, a teletext emitter connected to the system by, for example, a radio transmitted television channel, or by a telephone line, or otherwise. The external unit 9 loads the information into memory 5 to effect, after processing in the system, the display of the information on the screen of display unit 8.

The video display processor includes an address processor 10, a point processor 11 according to the invention, and a display processor 12, these units all communicating over time sharing bus 6, and bus 13, over which only data can circulate.

Buses 6 and 13 are connected to DRAM memory 5 over interface 14 which multiplexes the data and addresses destined for DRAM 5. There is also provided a control unit 15 with dynamic access to DRAM memory 5. This unit is described in detail U.S. Pat. No.

4,623,986, issued Nov. 11, 1986 by the instant applicant, and this unit will be referred to, hereinafter, as DMA circuit 15. In addition, there is provided a time base circuit BT associated with the display processor and communicating with DMA 15, television monitor 8, and the display processor itself. There is a detailed description of the display processor in U.S. Pat. No. 4,620,289, issued Oct. 28, 1986.

It has already been indicated above that CPU 1 communicates with VDP 2 by a single multiplex bus 3 which carries information under control of the signals themselves transmitted on line 4 in such a way that the addresses which are transmitted over this bus can be used, on the one hand, as addresses for DRAM memory 5 when CPU 1 communicates directly with this memory, and by means of which the consecutive data field is utilized to read or write in the memory, or, on the other hand, as an instruction field placing VDP 2 into a particular configuration for processing the data contained in the consecutive data field.

More specifically, in the said French patent application No. 83 03 142, the information which passes over bus 3 has two information fields; the first, enabled by signal AL (address latch), transports either an address for the direct accessing of DRAM 5 or an instruction to be executed by VDP 2. The second field enabled by the signal EN (enable) contains data which traverses the bus in one of two directions, the direction being determined by signal RW (read/write). With the first field, (address for the memory or interpreted instructions), the data can be sent to the memory or can come from it, or can be utilized by VDP 2 placing it in one of its two processing configurations.

DRAM 5, in the system here described, is a composite memory having a plurality of zones, addressed starting from a base address. This memory is composed of at least a page memory 5*a*, memories for the control of lines and columns 5*b* and 5*c* (see, in this regard, the patent application filed the same day as the instant application in the name of the instant applicant for a "Display System for Video Images on a Screen by Line by Line and Point by Point Sweeping, Ser. No. 082,965, filed Aug. 5, 1987, which is a continuation of application Ser. No. 746,594, filed June 19, 1985, now abandoned), at least one zone memory 5*d*, at least one form memory 5*e*, typographic character memories 5*f*, a buffer memory 5*g*, which adapts the various processing speeds to each other, in particular, that of central processing unit 1 and external channel 9 (see, in this regard, EP-A-No. 00054490), and, optionally, a memory 5*h* programmed in assembly language, for CPU 1,. All of these memory zones can be accessed by the internal units of VDP 2 and by CPU 1, these accesses being controlled either by the CPU 1 itself or by the device for dynamic access to memory 15 (see, in this regard, said U.S. Pat. No. 4,620,289). In order more easily to understand following description, it is useful briefly to review the operation of DMA circuit 15.

This circuit distributes access times to DRAM 5 depending upon the priority of the users of the system, that is, CPU 1 and the various units of VDP 2. DMA circuit 15 can be requested by each of these users to access the memory, either in a single cycle (monocycle) or in a series of consecutive accesses (multicycle). In this latter case, DMA 15 can control a particular number of accesses to the memory by column access signal (CAS), while utilizing only a single row access signal (RAS). This is particularly useful, for example, when this system prepares the display of an entire page on the screen, and it is necessary to access a very large number of memory positions, which are contiguous, and in regard to which, it is only necessary to increment the column address each time by a single unit, with the row address remaining the same for all accesses of this row. It is to be noted that all access procedures of memory 5 are determined by DMA circuit 15.

Figure 2A:
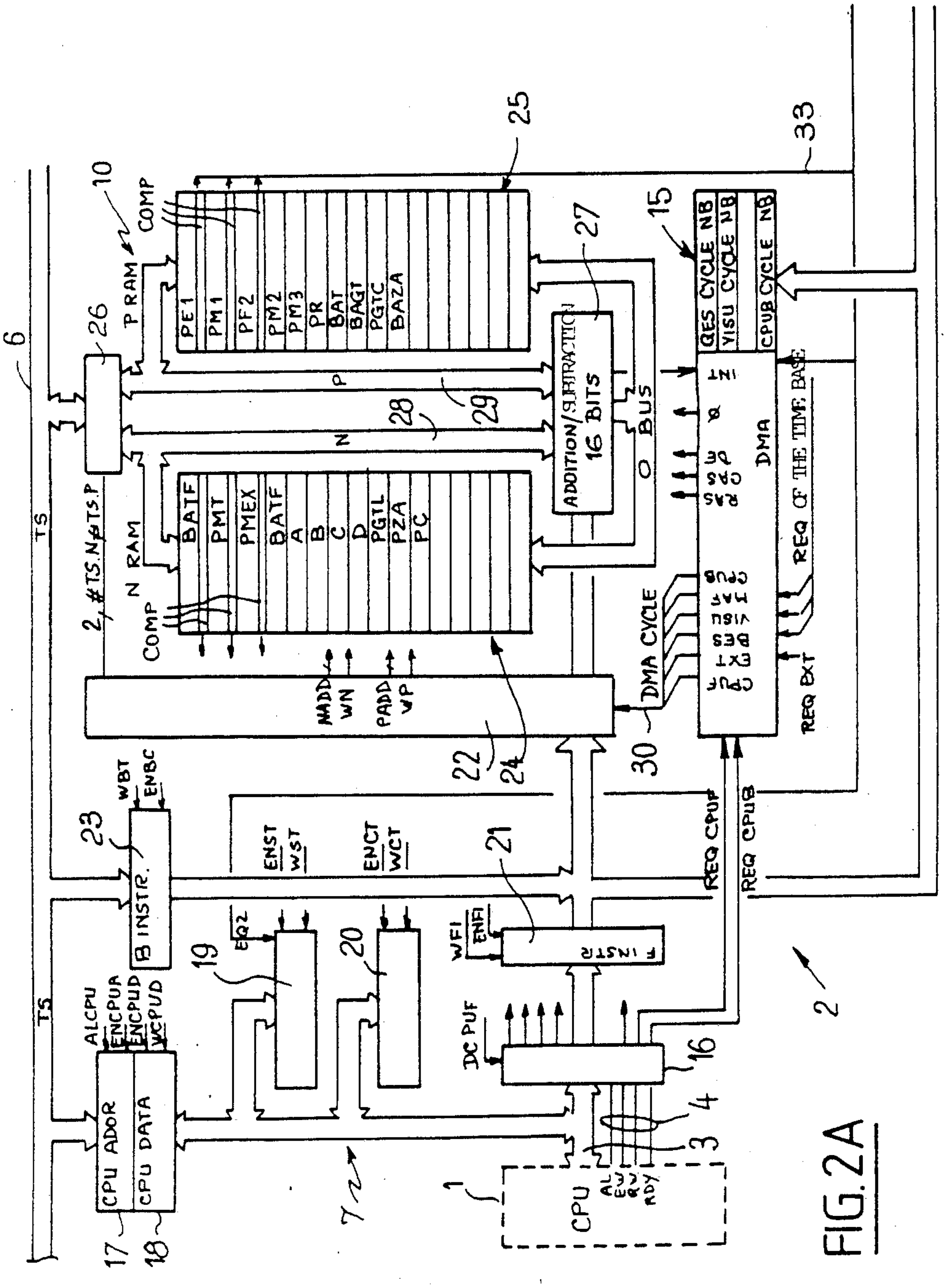
FIGS. 2A and 2B are more detailed schematics of this system.
Figure 2B:
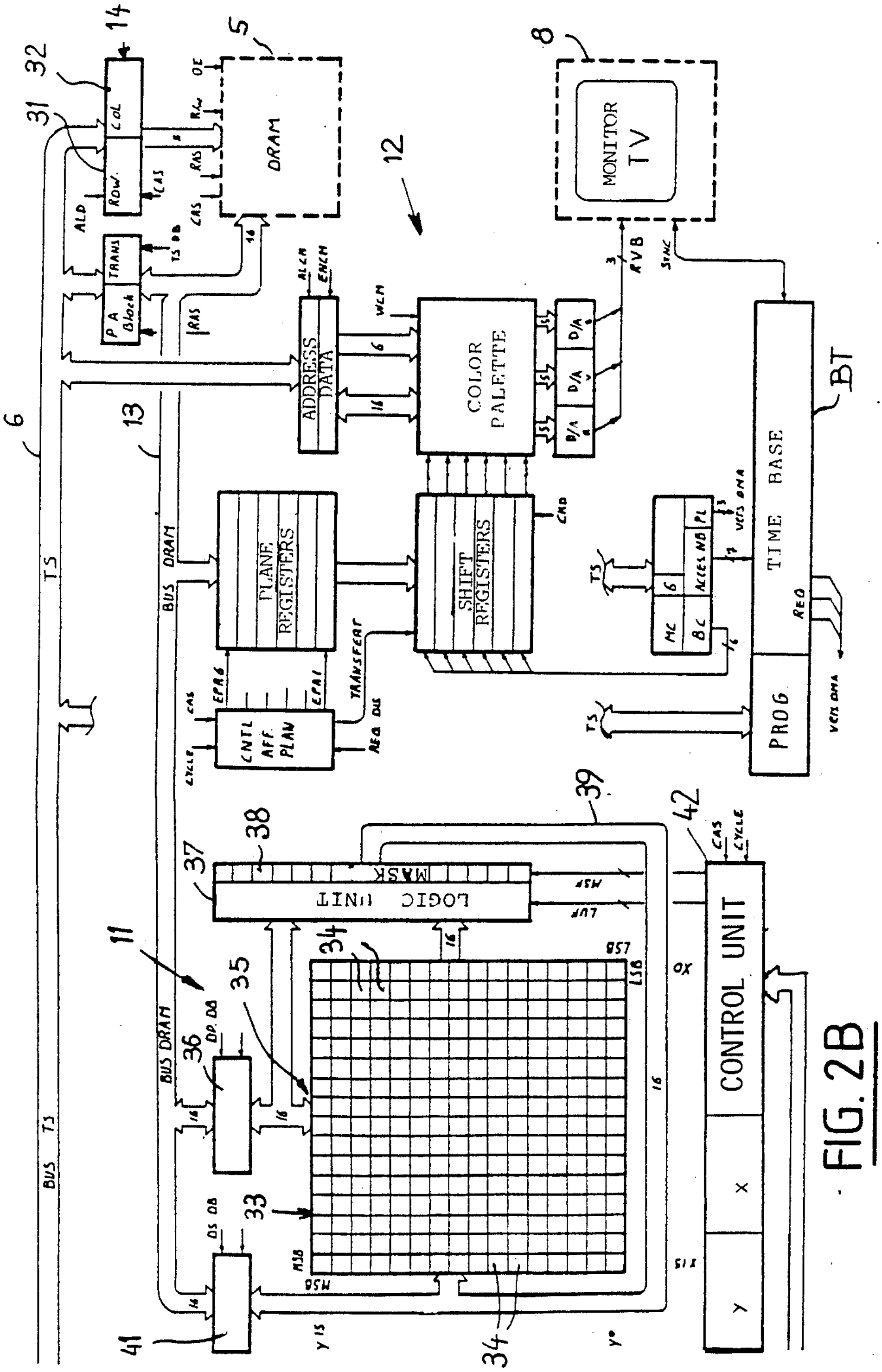

There will now be examined in more detail the schematics seen in FIGS. 2*a* and 2*b*.

Interface 7 selectively connects CPU 1 to VDP 2 for indirect accessing, or to DRAM 5 for direct accessing. It is capable of interpreting each address field.

Figure 3:
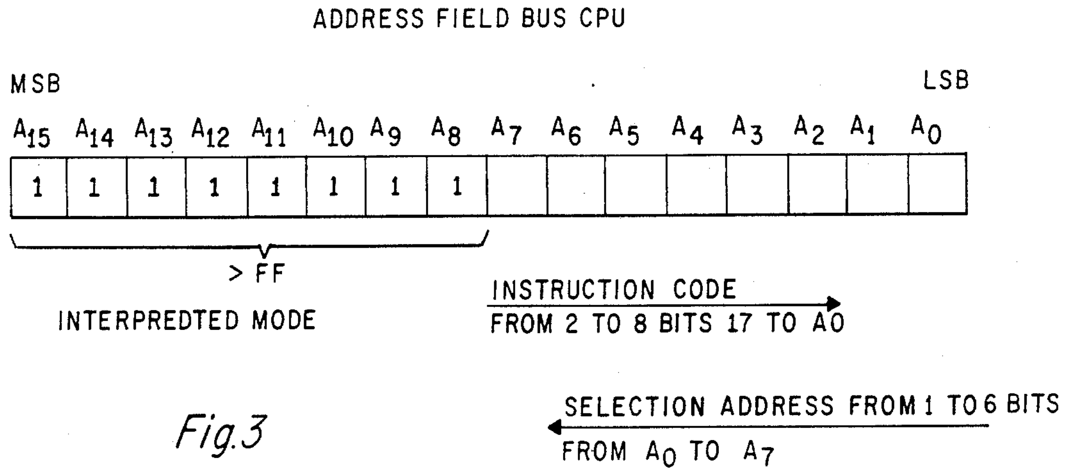
FIG. 3 is the address field of the central processing unit CPU with its interpretation possibilities.

FIG. 3 shows an example of the 16 address field distribution with 16 bits. When the field value is between (in hexadecimal) >0000 and >FEFF, this is a direct access to DRAM 5; however, when this value is between >FF00 and >FFFF, the field is interpreted as an instruction enabling the registers for writing or reading vis a vis the consecutive data field.

In this regard, the interface includes decoder 16 connected to bus 3 and having 16 outputs, 4 of which, namely, those corresponding to the two least significant bits, are used to enable the four registers of the interface. These registers are:

Address transfer register 17 enabled by signal ENCPUA.

A data transfer register 18 enabled by signal ENCPUD.

A state register 19 (status) enabled by signal ENST.

A control register 20 enabled by signal ENCT.

These four registers are controlled for reading and writing by signal R/W (for writing R/W=0) which is applied to their corresponding control inputs.

Consequently, when there is a direct access to CPU 1, decoder 16 generates address transfer signals ALCPU and ENCPU. For writing (R/W=0), the consecutive data field is transferred to register 18 while, for reading (R/W=1), the contents of this register are transferred at the cycle end on bus 3 so that CPU 1 can access the corresponding data read in DRAM 5. Decoder 16 also includes an output REQCPUF which requests, in DMA 15, an access cycle to DRAM 5. This output is connected to DMA 15 to allocate a memory cycle (signals RAS and CAS) to CPU 1. This cycle provides for transfers between CPU 1 and DRAM 5 over bus 6.

In the second case, if the address field has a value between >FF00 and >FFFF, the field is interpreted as an instruction.

These instructions can be principally divided into two groups called foregoing instructions and background instructions, respectively abbreviated as FG and BG.

It has been seen that, among the interpreted addresses, four addresses selectively designate the four registers 17 to 20 of interface 7. For this, the last two bits of the address field can be used according to the following truth table:

| | | | |
|---|---|---|---|
| RCTL | WCTL | 00 | Register 20 |
| RST | WST | 01 | Register 19 |
| RCD | WCD | 10 | Register 18 |
| RCA | WCA | 11 | Register 17 |

The other instructions resulting from an interpreted address, which are 256-4=252 in number, with the least significant 8 bits of the address field (FIG. 3), are adapted to execute cycles FG by register FG 21 which is a part of interface 7 and which is connected between certain output of decoder 16 and address processor 10 and to the address inputs of read only memory CROM 22 which is a part of this processor.

Register 23 of interface 7, called register BG, is loaded with instructions BG when it is designated by an address field, the interpretation of which calls upon one or several BG cycles. The designation of this register is made by the three least significant bits of the address field and, specifically, when these bits have the value 111. (Address field >FF07). When register BG 23 is selected, the consecutive data field contains a 16 bit instruction which places the VDP into a configuration for the execution of a large number of memory cycles under control of DMA circuit 15, these cycles being processed successively unless the instructions FG interrupt this process. In this case, the DMA allocates one or more FG cycles which are executed and then cycles BG are resumed where they had been interrupted, the process of interpretation as a function of the access priority to the memory being described in the above cited U.S. Pat. No. 4,623,986.

The address processor, besides memory CROM 22, includes two register stacks 24 and 25 called NRAM and PRAM which are loaded and read in 16 bits via transfer register 26 connected to time sharing bus 6. Each stack is connected to arithmetic and logic unit ALU 27, which is itself connected directly to bus 6 by transfer register 26 and to two 16 bit buses 28 and 29, N and P. The address processor is used principally to provide and calculate all of the address generated by the VDP for accessing memory 5.

Memory 22, when it is addressed by a part of the instruction contained either in register 21 FG or in register 23 BG, selects a microinstruction here stored to enable one or more registers of stacks 24 and 25, an arithmetic or logical operation in ALU 27, and transfer by register 26. The operations of ALU 27 are controlled by five bits of the microinstructions which can select the remainder (C1=0,1 or 2) and an addition or subtraction opeation on bus P or N, 28,29, or between these two buses.

Figure 4A:
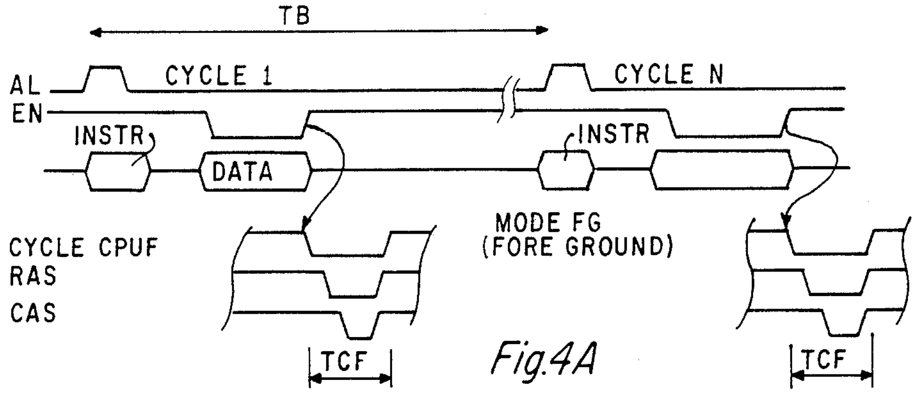
FIGS. 4A and 4B are time diagrams of foreground and background cycles which can be executed by the video system.
Figure 4B:
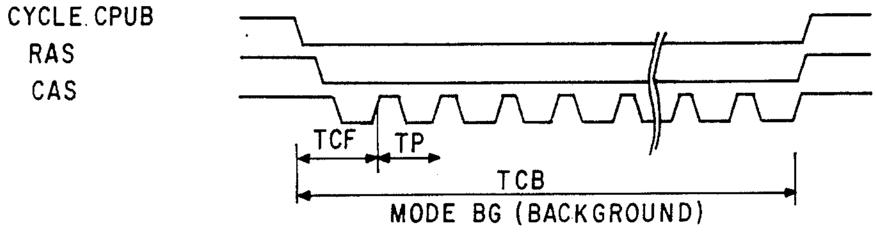

Control memory CROM 22 also provides the signals for the controlling the other units of VDP 2 for the transfer of data and addresses between the various buses and registers. The microinstructions addressed in CROM 22 are each time enabled in time sharing by DMA 15 on line 30 for establishing a relative priority order for memory accessing. In the case here discussed, six priorities are established in the order:

1. CPU—FG
2. External path (didon 9)
3. Display control
4. Display (display processor 16)
5. Refresh memory 5
6. CPU BG From the above it is seen that the foreground cycle FG is used by CPU 1 for direct access to the memory or to access the internal registers of VDP 2, and this for exchanging, with the memory, a single 16 bit word at a time. This is illustrated in FIG. 4*a*.

Background cycle BG is executed with a lower priority, that is, when VDP 2 does not have other cycles to execute for other users. The BG cycle is started either by the CPU by cycle FG (FIG. 4*b*), or by VDP 2. When it is the CPU which starts such a cycle or group of cycles, there can be, for example, a displacement of a group of words in memory 5, this operation being executed without the CPU intervening again after the cycle FG, so that the CPU can continue to process FG during the execution of the BG cycles, all of this being controlled by DMA 15 in the established priority (in this case there will be an interruption and then a restarting of the execution of the BG cycles.)

The considerable advantage of this arrangement is that various users can work and communicate at their own speed, without being interfered with by other users, the DM effecting the appropriate priority in all cases.

Interface 14 of DRAM 5 includes two transfer registers 31 and 32 controlled by the signals provided by the microinstructions of memory CROM 22 and by signals RAS and CAS from circuit DMA 15 to transfer the data and address fields of bus 6 to the DRAM or vice versa. The data can also be transferred directly into memory 5 from bus 13 to addresses transferred over bus 6 and register 32 from address processor 10.

A schematic illustrating the principle of point processor 11 is seen in FIG. 2*b*. In this system, this processor works in the BG mode for composing the image which is displayed on the screen by display processor 12.

The point processor includes a network 33 of RAM type memory cells 34, the particularity of the network being that it is accessible along two perpendicular axes X and Y. This network can be constructed in a hard wired version as described hereinafter (FIGS. 22 and 23), and as described in application Ser. No. 746,475, filed June 19, 1985, now abandoned.

Network 33 can also be in an integrated circuit version as will be appreciated by those skilled in the art.

Network 33 includes input/output Y 35 connected to transfer register 36 which is itself connected to data bus 13. This input is also connected to logic unit 37 associated with mask register 38. Mask register 38 is connected to transfer bus 39 connected to input/output X 40 of network 33 and to transfer register 41, also connected to data bus 13.

The point processor also includes control unit 42 which determines the address limits of network 33, enables the read/write signals for the two axes X,Y, and controls the logical functions executed on the data selected in network 33 by addresses X and data from DRAM 5. Control unit 42 is loaded from register BG 23 (FIG. 2*a*) and its configuration is determined by the microinstructions selected in memory CROM 22.

It is to be noted that access to point processor 11 (for reading and writing) is controlled by DMA circuit 15; however, the execution of data processing functions by the point processor can also take place independently of the cycles executed in the other elements of the video processor.

Figure 5:
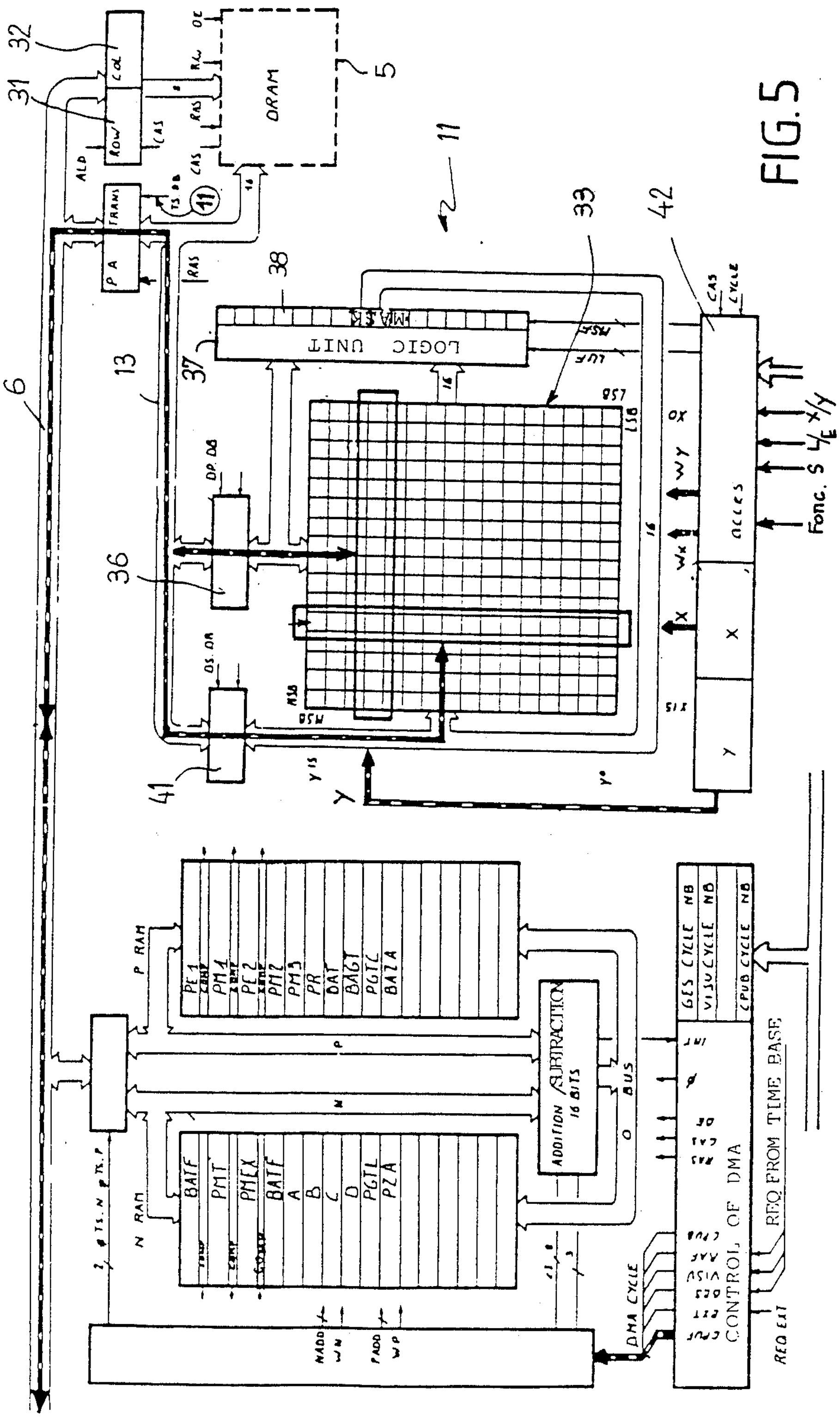
FIG. 5 is a partial schematic of the video system with the address processor and point processor, and the data circulation for accessing the point processor.
Figure 6:
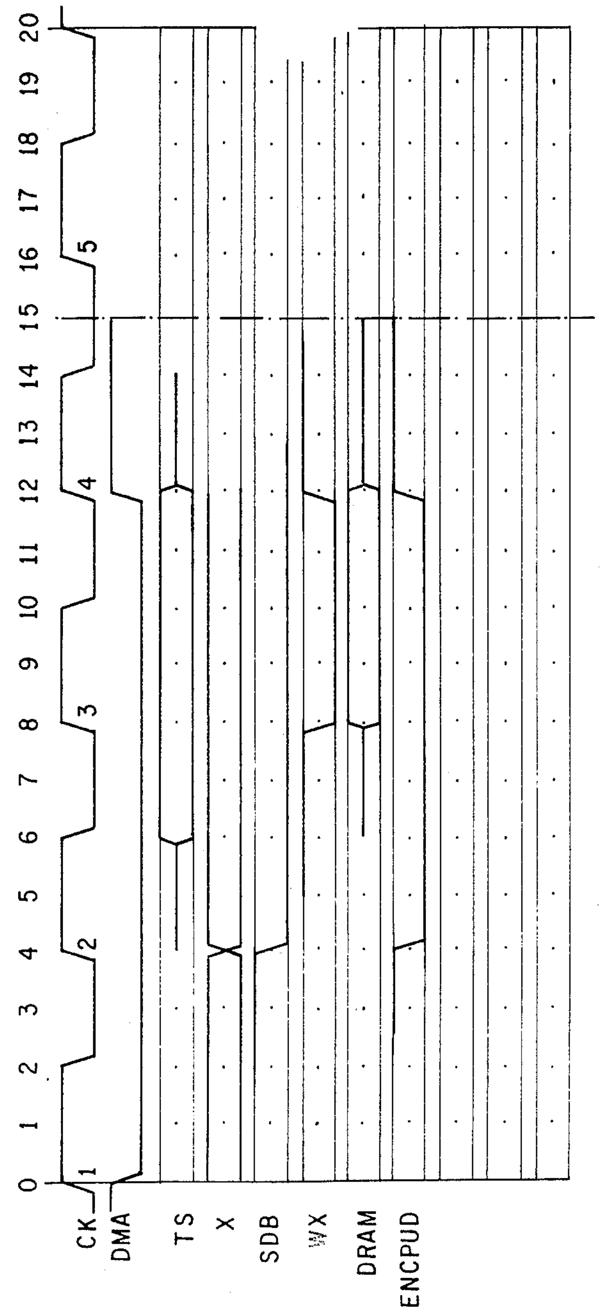
FIG. 6 is a timing diagram of the point processor accessing.

To access the point processor, CPU 1 uses an instruction which selects one of the words in the X or Y direction (FIG. 5). The data is transmitted for reading or writing, during a data field of the CPU, by means of buses 6 and 13. This transfer is effected during cycle CPUF. The decoding of the corresponding instruction FG in CROM 22 selects the microcode which controls access to the point processor. The address field of the instruction selects an X or Y addressing by control block 42 and a 16 bit word.

It is to be noted that the example here is in regard to a 16 bit system, such a system also used for the point processor network. However, other number bit systems can also be used.

Access to bus 13 is effected by enabling one of the transfer registers 36 or 41 by signals DS.DB and DP.DB from CROM memory 22 according to the appropriate microinstructions indicating such access.

For writing, the microprocessor accesses point processor 11 to construct, for example, a block of 16 words of 16 bits, which is thereafter transferred to a memory zone.

For reading, the microprocessor accesses a block of 16×16 words which were previously read in memory 5. The writing time diagram appears in FIG. 6. The CPUF cycle, started as in the previously described cases, enables the microcode selected in CROM 22 by instruction FG. At the beginning of the cycle, signal ENCPUD transfers the CPU 1 data from CPU DATA 18 register to bus 6, and then to bus DRAM 13 by signal TS.DP, to the input X of network 33 of point processor 12 and this data is loaded by signal WX to address X.

Writing in the Y direction is analogous. A read instruction uses the inverse path and principles in regard to address processor 10.

Figure 7:
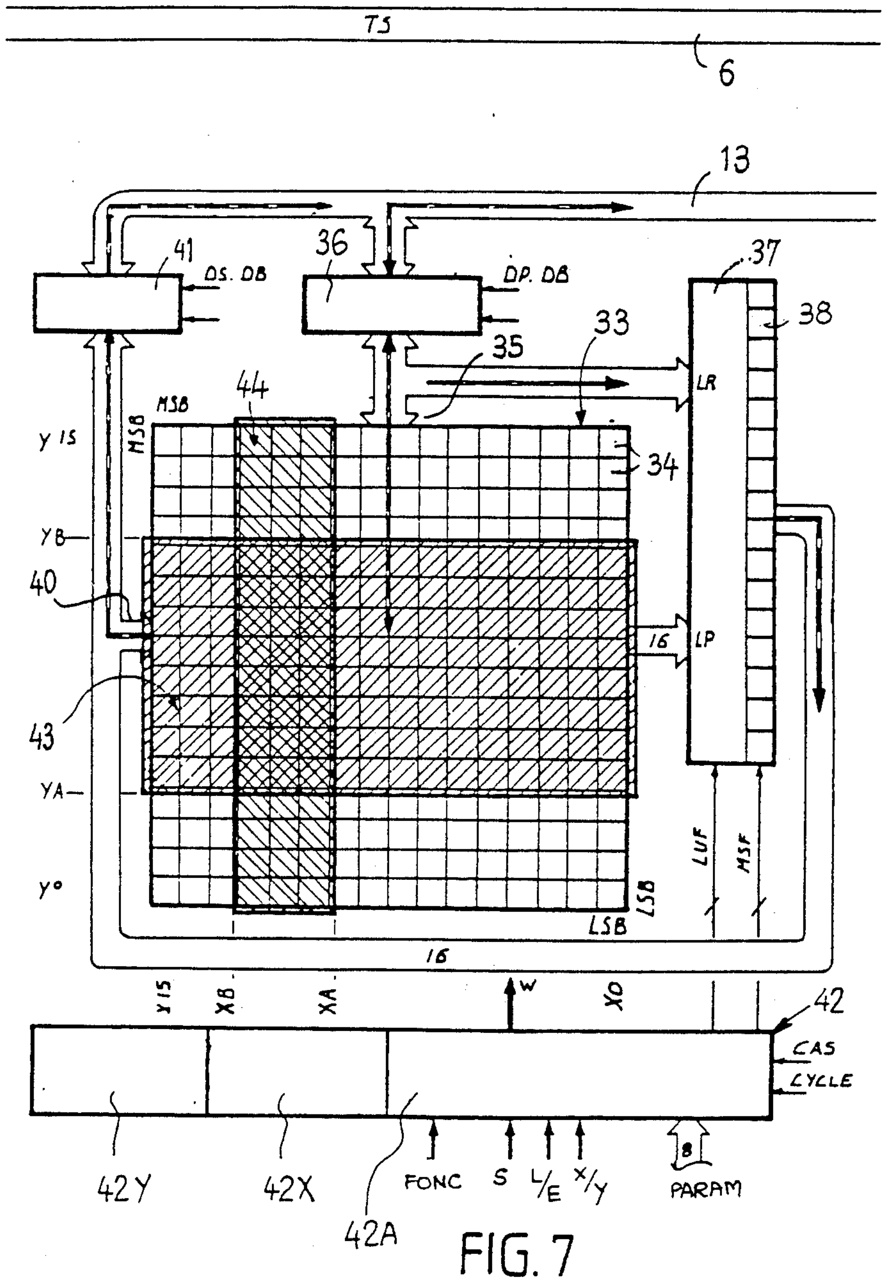
FIG. 7 is a detailed schematic of the point processor with its peripherals.
Figure 8:
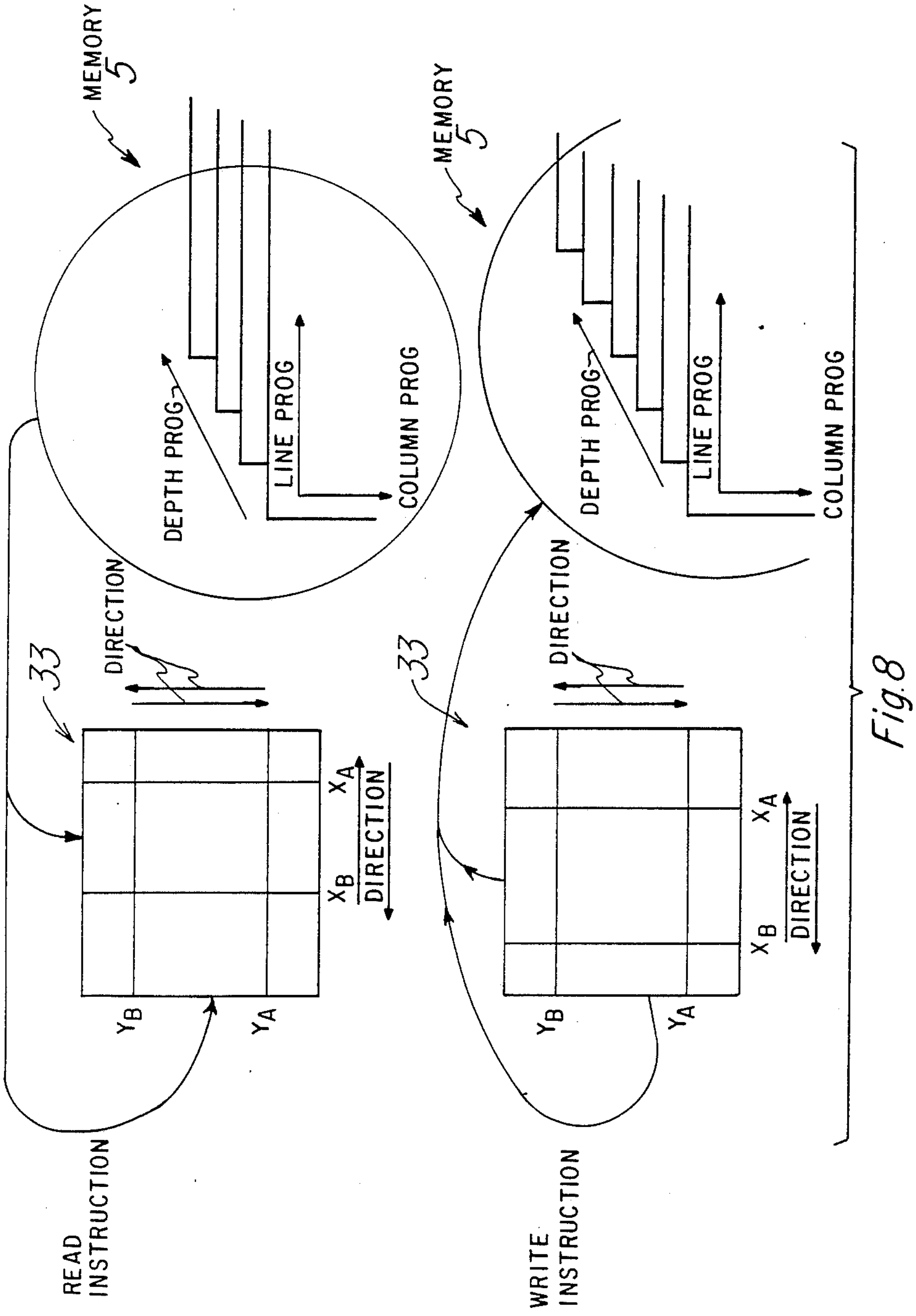
FIG. 8 is a diagram illustrating copying the contents of a zone of the general system memory by the point processor.
Figure 9A:
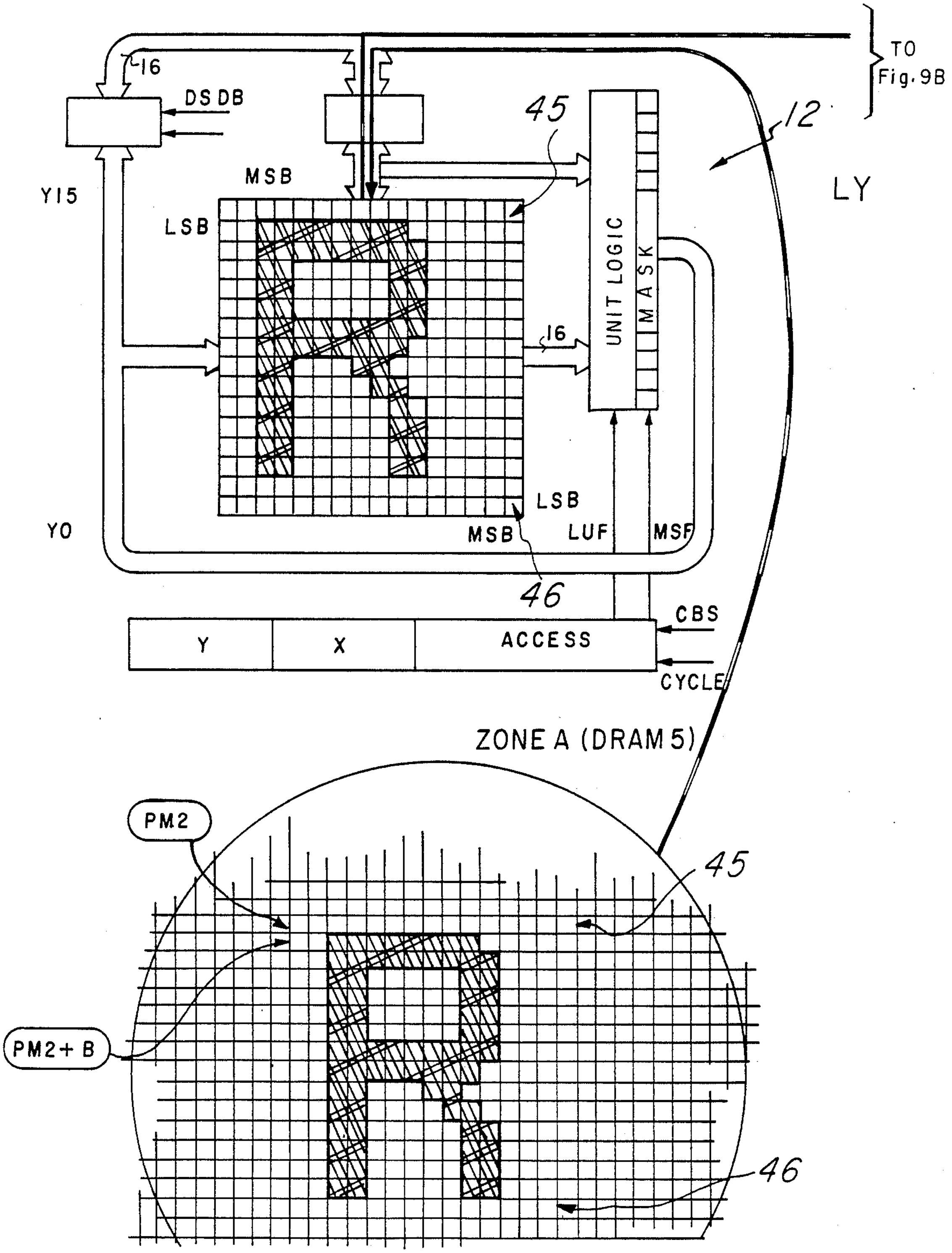
FIGS. 9A and 9B illustrate the information circulation between the general memory and the point processor in FIG. 8.
Figure 9B:
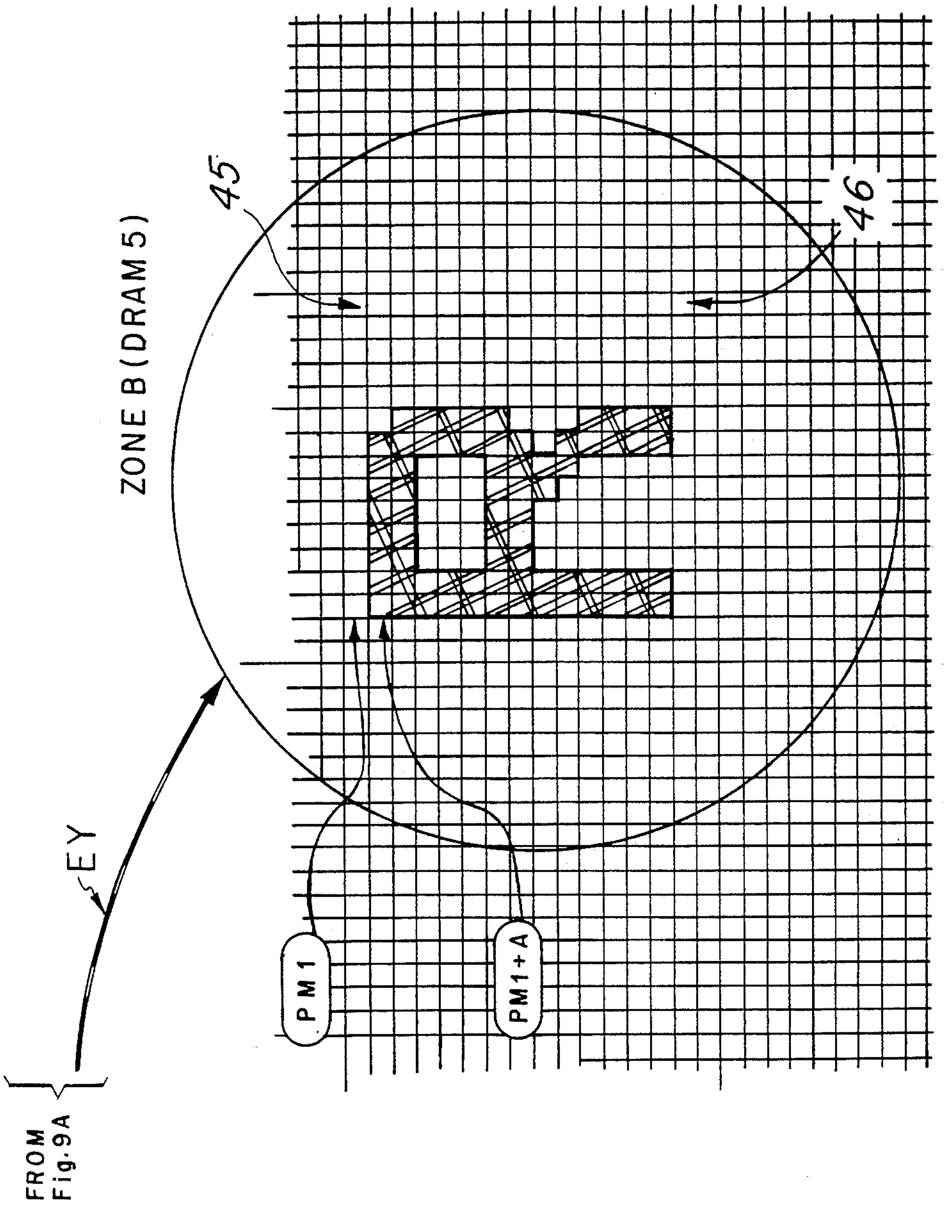

FIG. 7 shows point processor 11 with its operation control signals. Control unit 42 includes two sections 42X, 42Y for addressing in the X and Y directions and an access control section 42*a* which decodes the instruction from register 23 and enables the addressing, operation, and the transfer and write signals.

FONC—These inputs determine the operation to be effected by the point processor and logic unit.

S—Selects the progression directin, which can be increasing or decreasing, of the X and Y addresses.

L/E—Selects the data transfer direction:

for reading: from memory 5 to point processor 11.

for writing: from point processor 11 to memory 5.

X/Y—Selects the utilization axis of network 33:

in the Y direction, the data pass through register 36.

in the X direction, the data pass through logic unit 37 for reading, and through register 41 for writing.

The eight parameter bits (PRAM) select the limits between which the transfers are effected, XA−XB, or YA−YB.

Zone 43 is limited by two addresses YA and YB. The address progression goes from YA to YB, or from YB to YA, in the direction "S". Data transfer is effected for writing or reading depending of the value of "L/E". The most significant data bit MSB is located at the left.

The limits of zone 44 are XA=11 and XB=13, the choice of progression and transfer direction being made in an identical manner by the signals "S" and "L/E". The most significant bit MSB is at the top of network 33.

The point processor is selected by the input cycle and the addresses progress at the rate of signal CAS. The signals are provided by DMA circuit 15.

There will now be described several cases of data processing by the point processor.

A—COPY OF THE ZONES OF MEMORY 5. (FIG. 8)

Copying the memory 5 zones consists in reading the contents of a part of a zone, loading the part into the point processor, then transferring it from the point processor into another zone of memory 5. In the example here described, copying is executed in blocks of, at the most, 16 words which corresponds to the point processor capacity.

A reading instruction loads the point processor according to the parameters in the instruction code previously loaded in control block 42, namely:

X or Y reading access limits XA−XB or YA−YB, increasing or decreasing direction.

Addresses are processed in address processor 10. Reading pointer PM 2 (FIG. 5) and increment value "b" select a progression mode for the addresses in one of the three axes, depth, line, or column, of memory 5. The writing instruction parameters can be identical to or different from the reading instruction parameters. For each transfer, the execution of the read and write cycles is started by the loading of register 23. It is to be noted that progression in the depth direction of memory 5 corresponds to the passage from one memory plane to another at emplacements which correspond to an identical location in the image.

B-COPY OF ZONES WITH IDENTICAL PARAMETERS (FIG. 9)

The simplest case consists of copying the contents of a zone A into a zone B in the same memory, the reading and writing instruction parameters being identical. The zone A matrix to be transferred to zone B is in a square of 16 points by 16 lines. The reading or writing instruction parameters are as follows:

transfer axis Y point processor limits YA=0 and YB=15 decreasing direction of address progression.

Reading pointer PM 2 (FIG. 5) is programmed to the first address of zone A. Writing pointer PM 1 addresses the first word of zone B. The increment values A and B are selected according to the progression mode being used and according to the zones' characteristics. For example, zone A can be defined by a modulo 1 progression, the words 45 to 46 which define the form being contiguous in the memory. Zone B can be the foreground of a memory zone identical to that described above (FIG. 8) (512 points per line, 4 planes); the progression by column defines A=>80 (in hexadecimal).

The pointer and increment values are loaded into address processor 10. The loading of the read instruction starts the transfer. The first word 45 of zone A located at address PM 2 is transferred to address Y 15 of the point processor. The pointer PM 2 is incremented from the contents of B, and Y is decremented. The following words till word 45 are loaded in the same manner into the point processor.

When YN=0, access control unit 42 of the point processor transmits a signal to DMA 1 which stops the generation of control signal CAS for memory 5, which frees address processor 11. The cycel end is indicated in state register 19 (FIG. 2*a*).

Loading the write instruction causes transfer in the inverse direction from the point processor to zone B, utilizing pointer PM 1 incremented each cycle from the contents of A.

Figure 10:
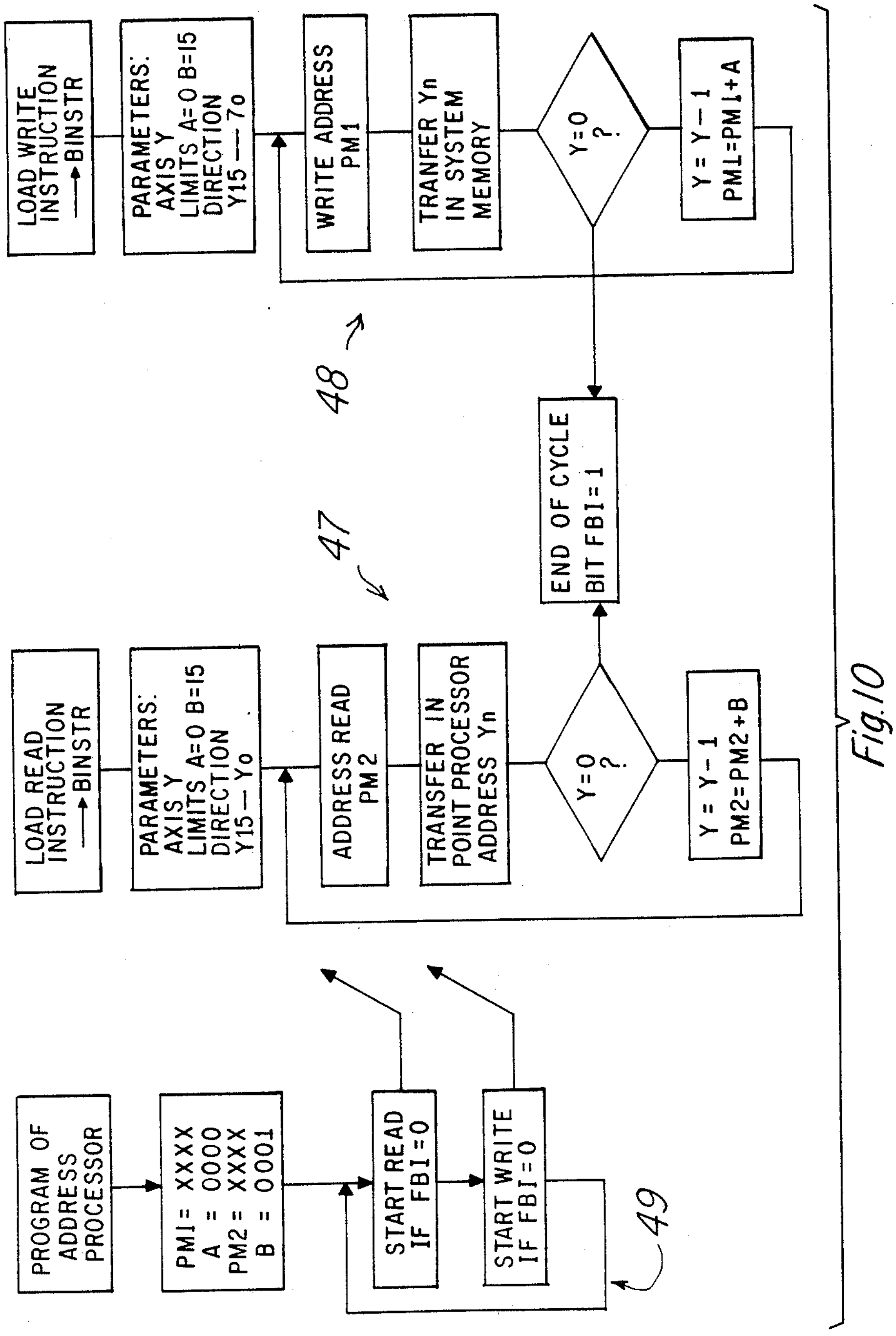
FIG. 10 is a flow chart illustrating the steps of copying a zone of the general memory.
Figure 11A:
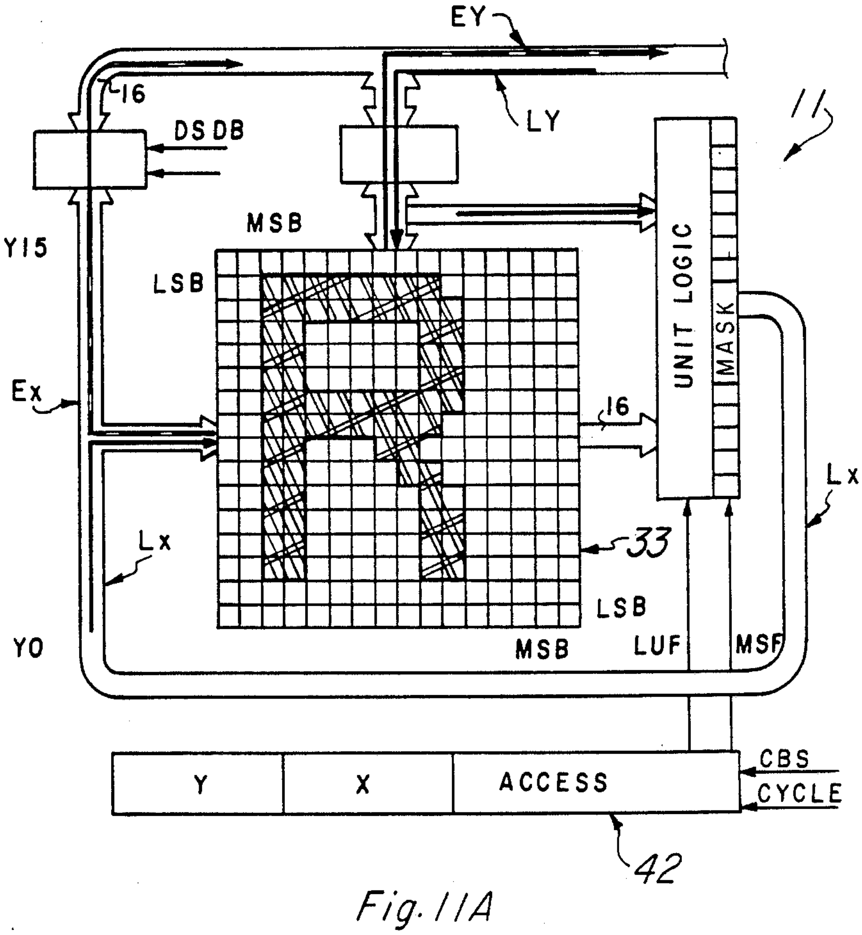
FIGS. 11A and 11B illustrate how the point processor inverts a form to be displayed.
Figure 11B:
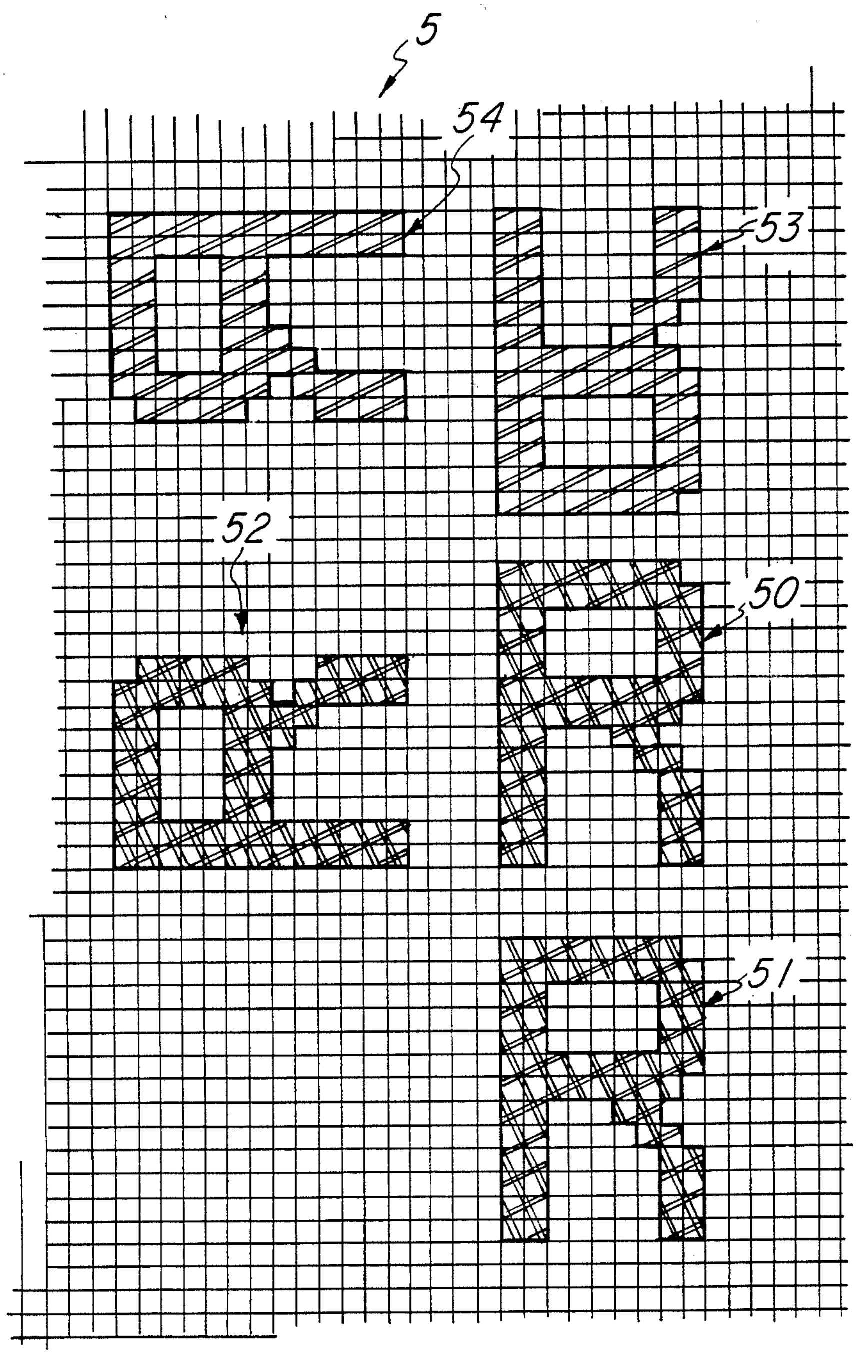

FIG. 10 is a flow chart of the operations thus executed. After programming the address processor pointers, the reading instruction is triggered if there is no cycle BG in progress (FB1 =0). When the parameters are loaded, the transfer loop 47 is repeated 16 times from Y 15 to Y 0.

In the same manner, CPU 1 loads the writing instruction for transferring information from the point processor to memory 5. Loop 48 is repeated 16 times from Y 15 to Y 0. Loop 49 is repeated as many times as there are blocks of information to be transferred.

The execution time for loops 47 and 48 depends upon the address progression. If the calculation of the next address does not cause a column address overflow, the first access is a complete RAS and CAS cycle and the following cycles are only CAS cycles.

The processing time TT is thus:

$$5TC+3TC\times 15=50TC,$$

that is, 2 microseconds with, as an example, $TC=40nS$.

In the worst case, if each address calculation causes an overflow of the address column, each access is a complete RAS cycle and CAS cycle. The access time is then:

$$5TC\times 16=80TC, \text{ that is 3.2 microseconds.}$$

C—COPY OF ZONES WITH DIFFERENT PARAMETERS

In the preceding example, reading was effected by path LY (reading Y) and writing by path EY (writing Y) of the point processor, the ends and progression direction of the addresses being identical. By using different reading and writing parameters, there can be obtained either a rotation of the image or a form inversion, FIG. 11.

The original form 50 is copied into point processor 11 by a read cycle over path LY. The read parameters are the following: path Y, ends YA=0 and YB=15, direction of progression, Y15 to Y0.

Increment parameter B of reading pointer PM 2, FIG. 5, is selected for increasing column progression. At the end of the operation after 16 reading cycles, the original form 50 is loaded into point processor 11.

The contents of the point processor are used for writing forms 51 to 54 into memory 5. The increment parameter A of writing pointer PM 1 is the same as B if the destination zone has the same characteristics as the source zone (original form).

Form 51 is the copy of the point processor contents, using the same address progression over path EY with the parameters: path Y, limits YA=0 and YB=15, progression direction Y 15 to Y 0.

The form 52 is the copy of the original form with a counter-clockwise rotation of 90°. Path EX is used for writing, the writing parameters being the following: path X, limits XA=0 and YB=15, progression direction X O to X 15.

Form 53, the inverse of the original, is obtained over writing path EY, the address progression parameters of the point processor being inversed: path Y, limits YA=0, and YB=15, progression direction Y 0 to Y 15.

Form 54, the inverse of form 52, is a clockwise rotation of 90° of form 53. It is obtained with the following parameters: path X, limits XA=0 and XB=15, progression direction X 15 to X 0.

Figure 12A:
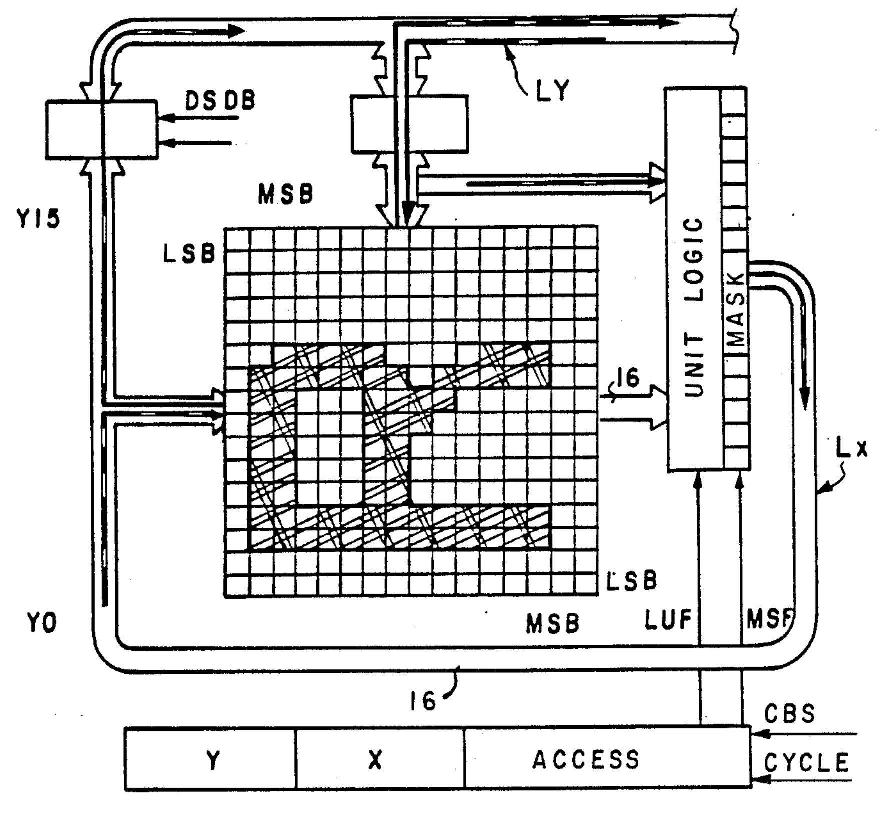
FIGS. 12A and 12B are another example of form inversion.
Figure 12B:
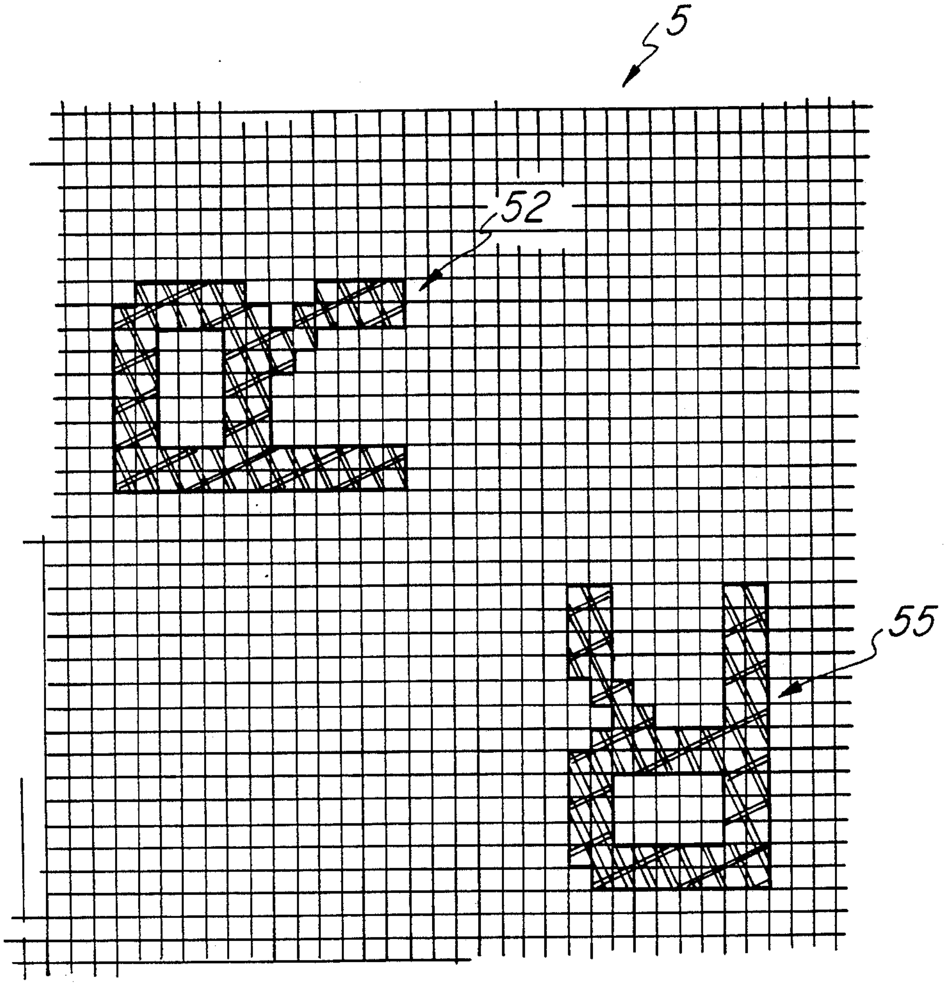

FIG. 12 shows a rotation of the original form 50° of 180°. It is not possible, however, to obtain this 180° rotation in a single operation. It is necessary to effect a 90° image rotation in a buffer memory zone of DRAM 15 and to recopy this into point processor 11.

Form 52 is copied into the point processor over path LY with a decreasing address progression from Y 15 to Y 0.

Form 55 is obtained using path X with the following parameters: path X, limits XA=0 and XB=15, progression direction X 0 to X 15.

The reading and writing pointer progression is not changed.

In all of the cases examined above, the total execution time for cycles of 16 readings and 16 writings is between 50 TC and 80 TC, or 2 microseconds to 3.2 microseconds with $TC=40nS$.

D—COPY WITH DIFFERENT INCREMENT VALUES

Figure 13A:
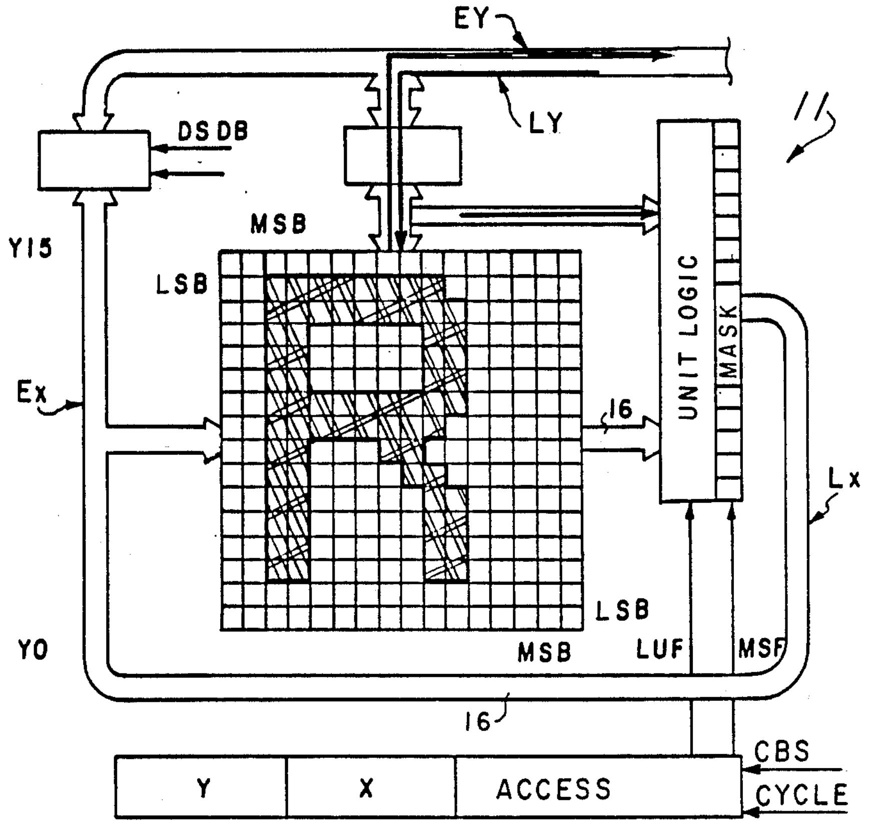
FIGS. 13A and 13B illustrate the manner in which an enlargement or a reduction in form size can be obtained.
Figure 13B:
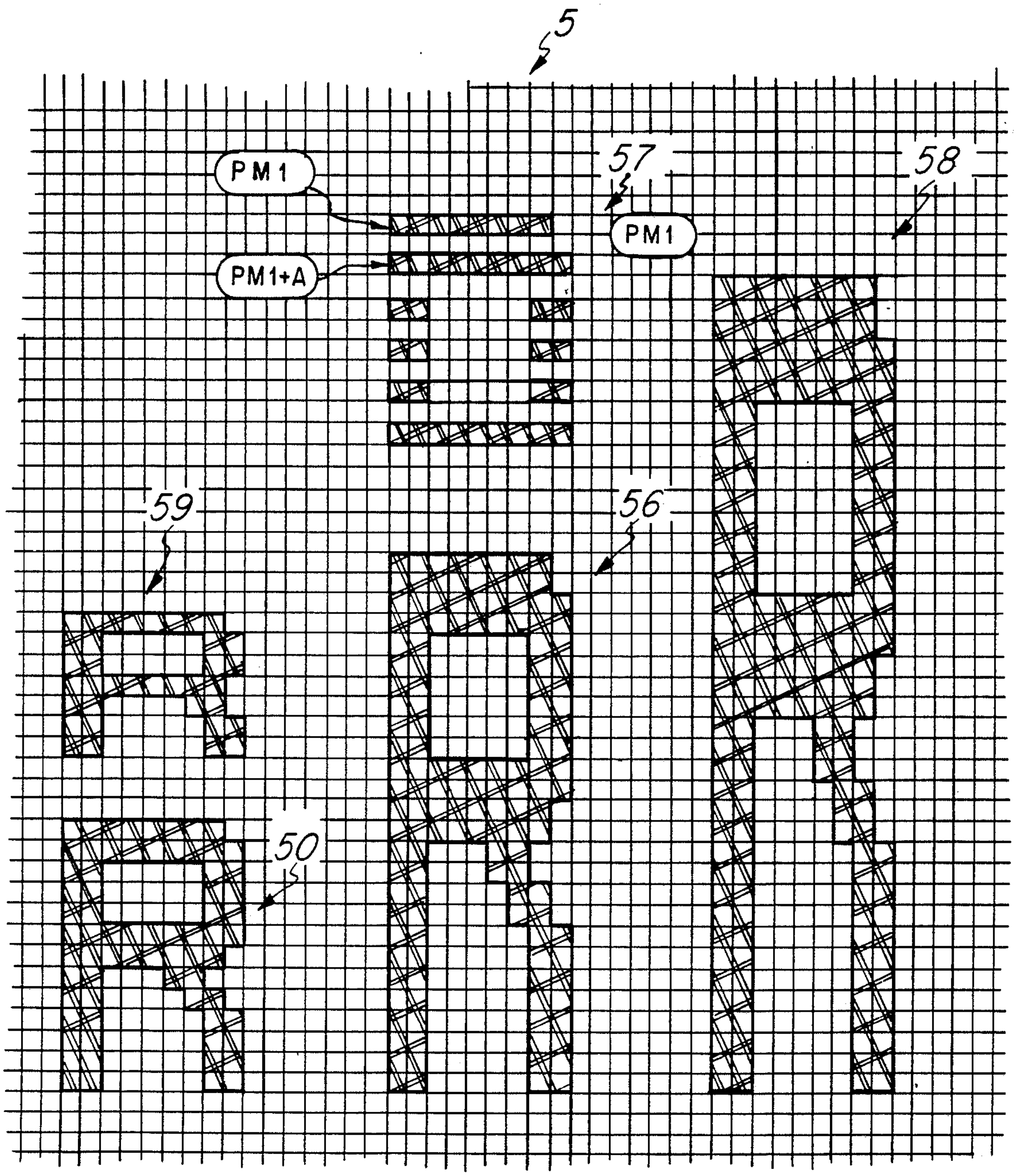

In the above, the writing and reading pointer progressions of memory 5 were identical. By changing the values of the relative progressions of the reading and writing pointers, the effects of size change and "zoom" can be obtained, see FIG. 13.

The original form 50 is loaded into point processor 11 over path LY.

A double height letter is obtained by executing two sequences of 16 cycles of the writing instruction over path EY. During the first instruction, pointer PM 1 contains the address of the first line of the matrix. During the first writing sequence, the value A causes column progression jumping one line at a time. Part of the form obtained is represented at 57. After the first 16 writing cycles, pointer PM 1 contains the address of the second line of the matrix. The progression is the same during the second sequence, the lines previously jumped being filled with the contents of the preceding line. At the end of the second 16 cycle sequence, there is obtained the double height letter 56.

The principle is the same for a triple height letter 58 which is obtained by executing the 16 writing cycles three times.

To obtain a reduction in the height 59, the progression of pointer PM 2 during the reading cycle is such that every other line is transferred to the point processor. The reduced sized letter is copied into memory 5.

From the above, it is seen that one can combine an image rotation with a dimension change by selecting writing/reading paths X and Y of the address progression as a function of the desired manipulation.

E—FORM DISPLACEMENT

The above examples concern image manipulation without a translation of the image matrix.

Figure 14A:
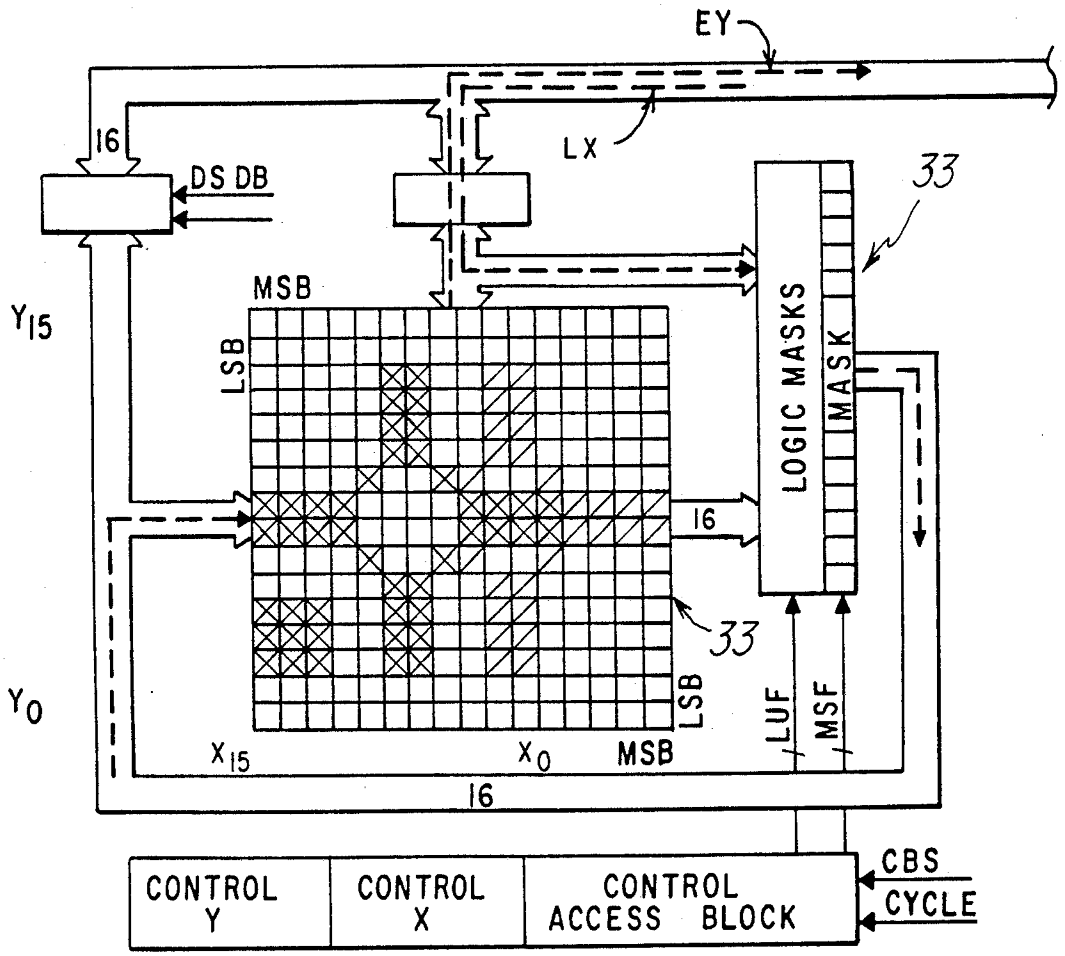
FIGS. 14A to 14C illustrate how a form can be moved within an image.
Figure 14B:
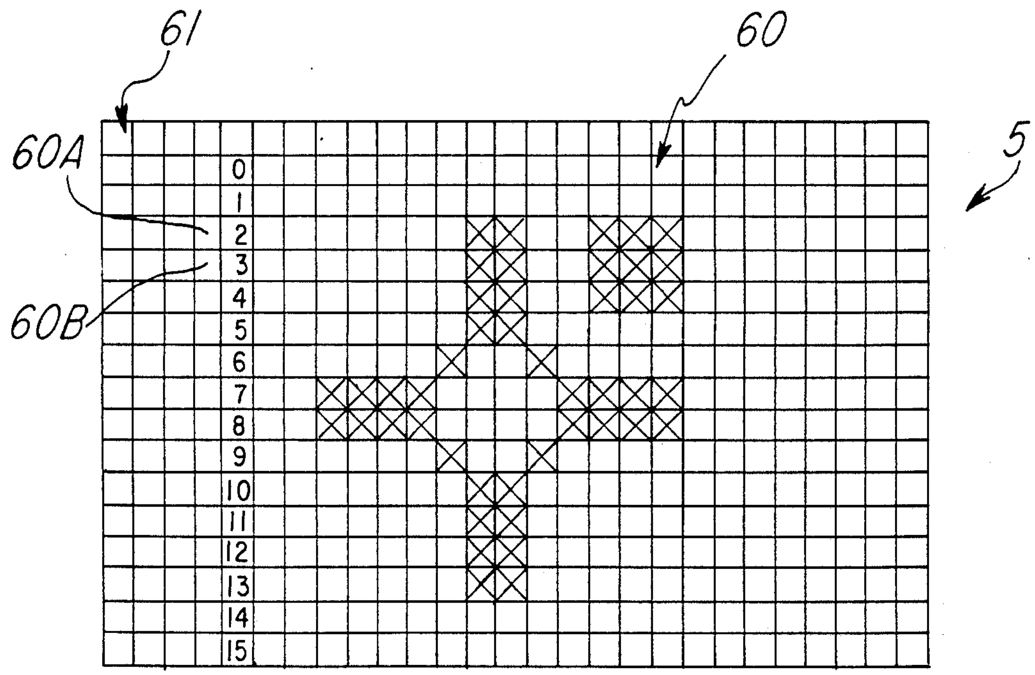
Figure 14C:
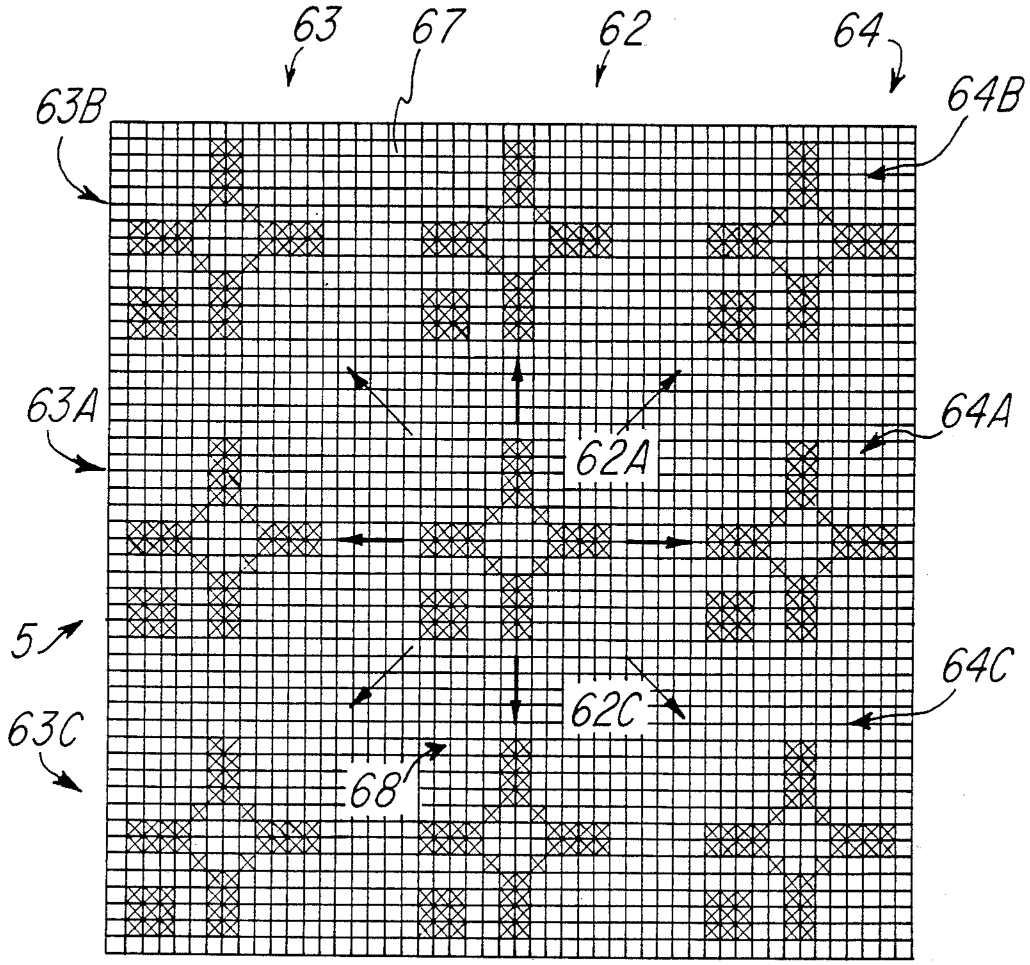

FIG. 14 illustrates a case in which the image matrix (here a cross called a "mouse" by the specialists) is displaced on a single plane having a uniform background color.

The original form 60 is defined in zone 61 of DRAM memory 5. For each displacement, this form is copied into point processor 11 using the reading parameters for the desired displacement. It is assumed that the form is held in a 16×16 matrix and that, in the example, this form is successively displaced to memory cells (or to image points, which is the same thing) in all directions.

Column 62 represents vertical displacements, two lines in the upward direction for form **62*b* and two lines toward the bottom for form 62*c*. The original form must be framed in the center of network 33 of the point processor. The reading pointer PM 2 has address 60*a* of the original. The transfer parameters in the point processor are the following: reading by path LX, transfer limits XA=2 and XB=13, progression direction X 13 to X 2**.

In the first cycle, the contents of address **60*a* of the original are transferred in the point processor to address X 13. The pointer PM 2 is incremented to point to address 60*b* and X is decremented. In repeating this sequence 16 times, the twelve words, 2 to 13 of the original, are transferred to addresses X 13 to X 2 of the point processor. The form is at the center of the network 33**.

To obtain the displaced forms **62*b* and 62*c*, the writing pointer PM 1 must be programmed to the position corresponding to the first word of the form. (For 62*b*, address 67, and for 62*c*, address 68.) The inverse transfer of the point processor is effected by path EY, utilizing the following parameters: writing by path EY, limits YA=2 and YB=13, progression direction Y 13 to Y 2**.

The pointer PM 1 evolves in a column progression at each cycle.

The displacements to the left, right and diagonally, are effected according to the same principle. However, the original is copied in the point processor at the position corresponding to its horizontal displacement.

For example, in column 63, the parameters are the following for a displacement of 2 points to the left: reading by path LX, ends XA=4 and XB=15, progression direction X 15 to X 4.

At the end of the transfer, the form is displaced in the point processor. The form is recopied in memory 5 by path EY according to the principles described above. If the form is on the border between two 16 bit words, the transfer is effected in two reading/writing cycles.

The displacement can be effected for any number of points in the eight directions.

E—DISPLACEMENT OF FORMS ON A BACKGROUND

Figure 15:
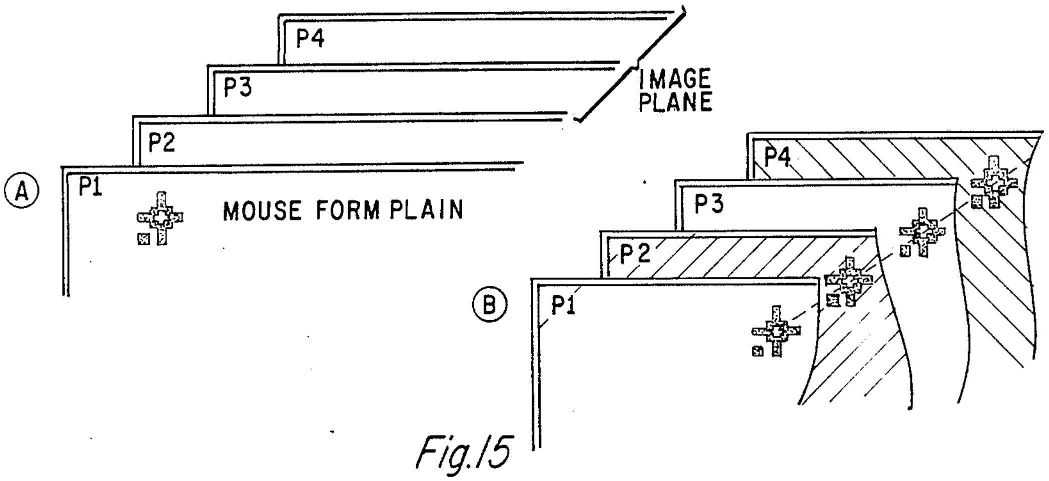
FIG. 15 illustrates the movement of a defined form on a color plane or a plurality of color planes.

The preceding section describes a motif which is displaced in all directions on the screen. This motif can be a mouse assisting in the composition of an image. Different cases are possible, FIG. 15.

E1. The mouse moves in a plane separate from the image planes:

if the page memory is coded on four planes P 1 to P 4, the mouse is in plane P 1; it is superimposed with its color on planes P 2, P 3, and P 4 which define an eight color background image (see, in regard to memory planes, the above cited French patent application No. 83 06 741).

Functioning reverts to the preceding case, the incremation parameters of the pointers being different.

E2. The mouse is displaced in all planes:

In this case, the background image is coded on four planes in 15 colors, the sixteenth color defining the mouse.

The image can also be coded in 16 colors, each point of the mouse must appear in a color which is easily distinguishable from the colors of the background.

Figure 16:
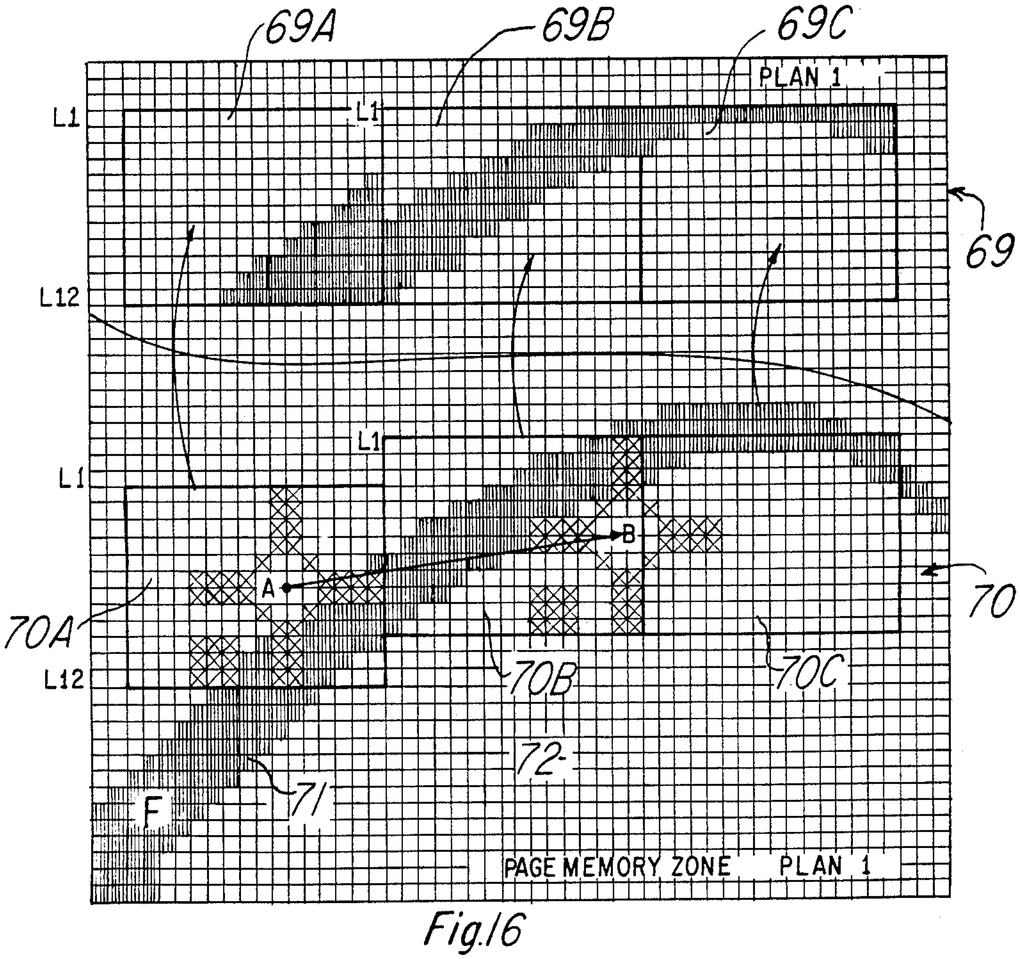
FIG. 16 illustrates the principle of movement of a form in a displayed image.

Case E2—The form is defined in a single color, FIG. 16.

To obtain this displacement, one assigns to a section of the composite memory 5, a safety zone which is represented at 69 in FIG. 16; there is also shown a portion 70 of the memory zone relating to plane 1 regarding the displacement under consideration. The form examined here is the mouse 60 of FIG. 14.

For this displacement example, the mouse 60 is defined in one color out of 16. To simplify, the color code is "1111" that is, that the points of the mouse are represented by "1's" in the four color planes.

Treating the planes separately, the operation includes setting the bits of the plan in question to "1" at locations where the mouse is to be superposed. Upon removing the mouse, the initial figure of the image to be displayed includes two zones, a zone 71 represented by "1" bits and a zone 72 represented by "0" bits, other forms in the planes P 2, P 3, and P 4 allowing one to obtain 15 color combinations on the screen. It is to be noted that the form of the zone 71 is here arbitrarily selected to represent the contents of the current image on which the mouse is to be superposed.

Th original formula of the mouse 60, FIG. 14, is also represented by "1" bits, the background being "0" bits.

In this example, the mouse will be displaced from position A to position B. The operations are the following:

I—Restitution of the former background (zones 71 and 72) memorized during the previous displacement in the safety zone 69.

II—Save the zone 70B and C in the safety plane at 69B and 69C.

III—Superimposed the mouse 60 on zones 70B and 70C.

Figure 17:
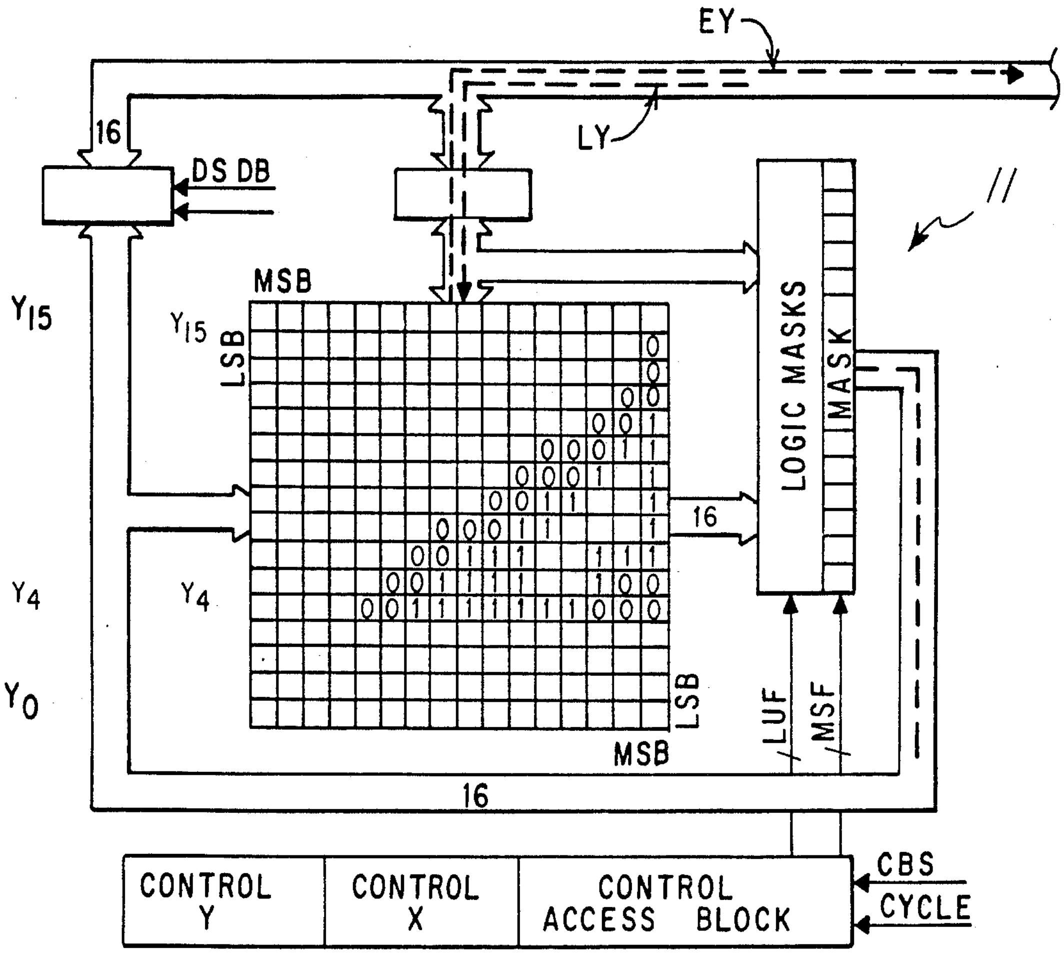
FIG. 17 shows a phase of the movement constituted by the restitution of a previous image background.

IV—The restitution of the previous background is illustrated in FIG. 17.

When the mouse is located at the interior of a group of 16 points, the safety zone 69, FIG. 16, will contain as many words as the mouse has lines. The reading pointer PM 2, FIG. 5, is positioned on line L 1 of zone 69A. The writing pointer PM 1 is positioned on line L 1 of zone 70A. The twelve words of 16 bits representing 12 lines of 16 image points are transferred into point processor 11 by a reading instruction having the following parameters: reading by path LY, limit points YA=4 and YB=15, progression direction Y 15 to Y 4.

After the execution of 12 cycles, the form to be restored will have been transferred to the point processor, FIG. 7. The writing instruction uses the same parameters with the transfer being the inverse using path EY.

At the termination of execution, the previous form is restored and the mouse erased.

Figure 18A:
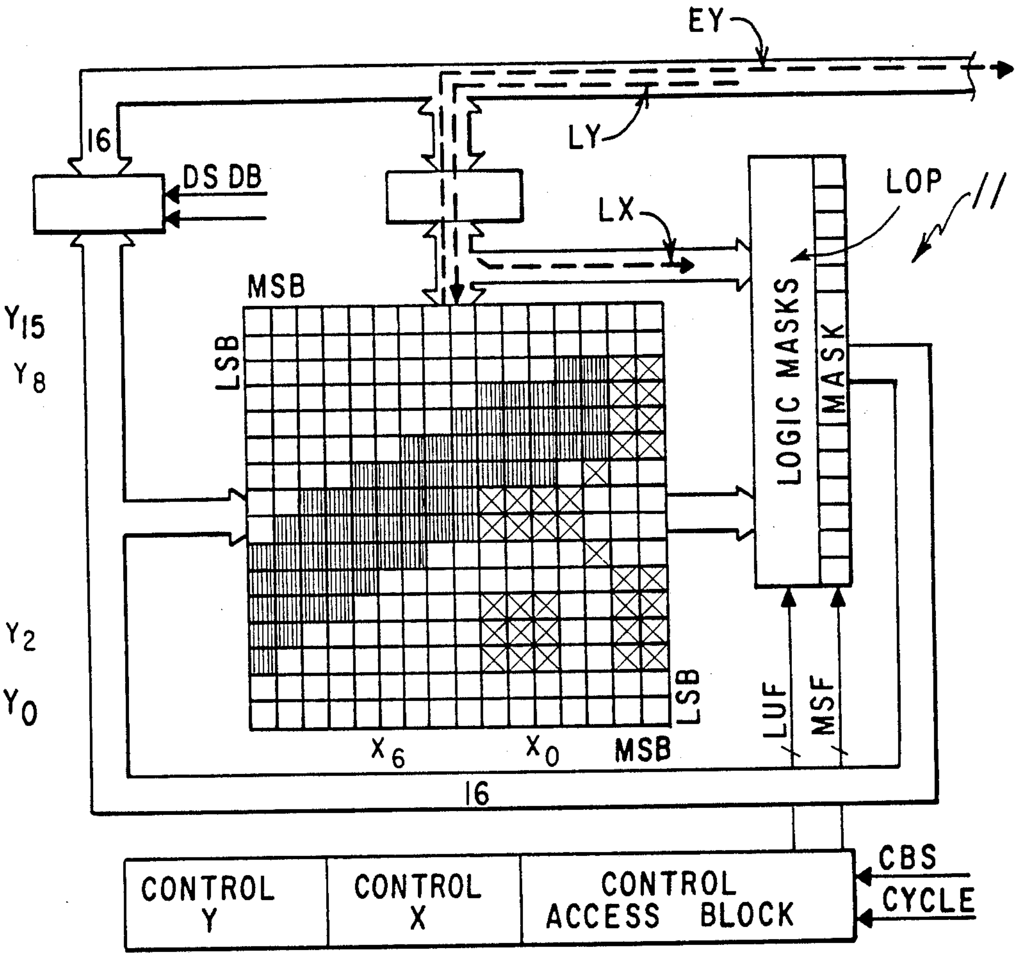
FIGS. 18A and 18B show how form and background are recomposed by movement.
Figure 18B:
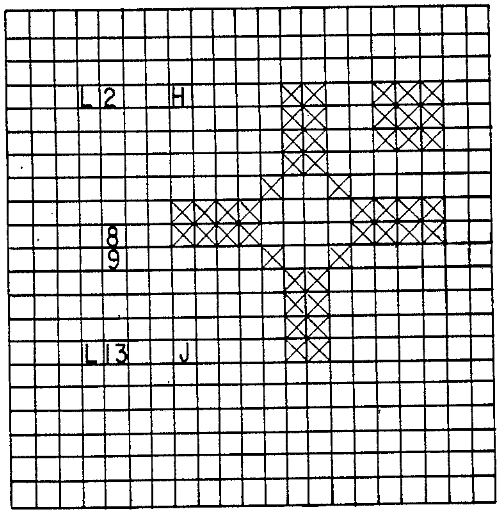

II—The retention of the new background and the superposition of the mouse are effected in the following manner, FIG. 18. As the new position B of the mouse is on the border between adjacent words, the zone 70B and 70C must be saved in zones 69B and 69C, FIG. 16, for restitution during the next displacement. The data of the zone 70B should therefore be transferred to point processor 11, the data from the point processor transferred to safety zone 69B, the part of the mouse 60 in question superposed, and the data of the point processor transferred to zone 70B.

The transfer of the data from zone 70B to the point processor is effected via path LY, the parameters of the point processor being the following: reading path Ly, limits YA=2 and BY=13, progression direction Y 13 to Y 2.

Pointer PM 2 is on line L1 of zone 70B, FIG. 16. After twelve reading cycles, the form contained in zone 70B will be in the point processor. The inverse transfer of the data from the point processor to zone 69B is effected by the same process with PM 1 pointing to L1. To obtain zone 70B with the part of the mouse, lines L2 to L8 of mouse 60 are superimposed at the respective positions X6 to X0 of the point processor, the parameters of which being the following: reading path LX, limits XA=0 and XB=6, direction of progression X6 to X0, function "or" between the inputs L and P effected in logic unit 38.

Reading pointer PM 2 points to line L2. At the first reading, the word selected by L2, zone 60, FIG. 18, is presented at the inputs L of the logic unit while the word selected by "X6" is applied to inputs "P". The logic unit effects function L or P and the result placed at address X6. After seven identical operations, lines 2 to 8 of the mouse are superposed at zone 70B.

The process is identical for superposing the remaining part of the mouse on form 70C. The superposition method is repeated in the four color planes.

F—FORM DISPLAYED IN SIXTEEN COLORS

Figure 19:
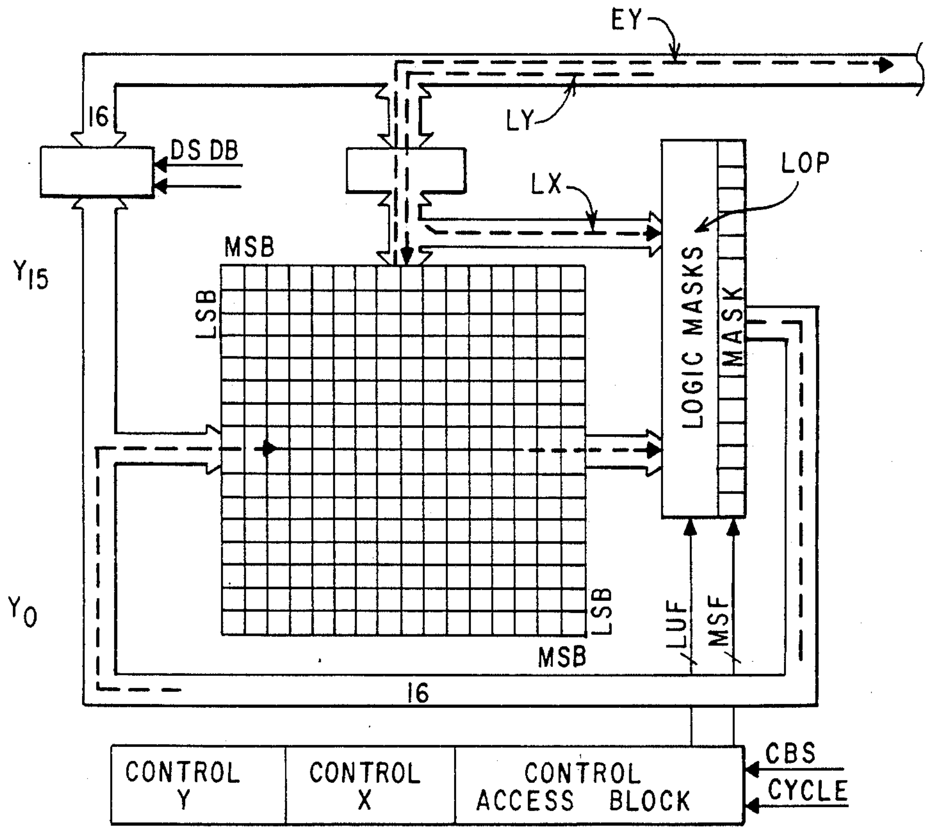
FIG. 19 illustrates form superposition on the image background by color inversion.

If all color codes are used for the background image, the mouse form must be distinguishable whatever the color points forming the background might be. There is a method of changing the point color by an "or exclusive" which inverses the background bits on which the mouse is superposed, FIG. 19. This method does not use the safety zone. The displacement of the mouse is as follows: restitution of the background by an "or exclusive" function on position A executed in logical unit 38, and display of the mouse on the background by an "or exclusive" function.

One proceeds as follow: zone 70B to be restored is transferred to the point processor by path LY, mouse 60 is transferred to the point processor, by effecting an "or exclusive" function between the words in the point processor, path P, and those from zone 60, path L. The result is placed at the same address, XN, at the end of processing, the contents of the point processor being transferred into zone 70A. The original backgroudn is restored, and the new position "B" of the mouse, is created according to the same principles.

The operation is executed for all color planes.

G—ZONE SUPERPOSITION

Figure 20:
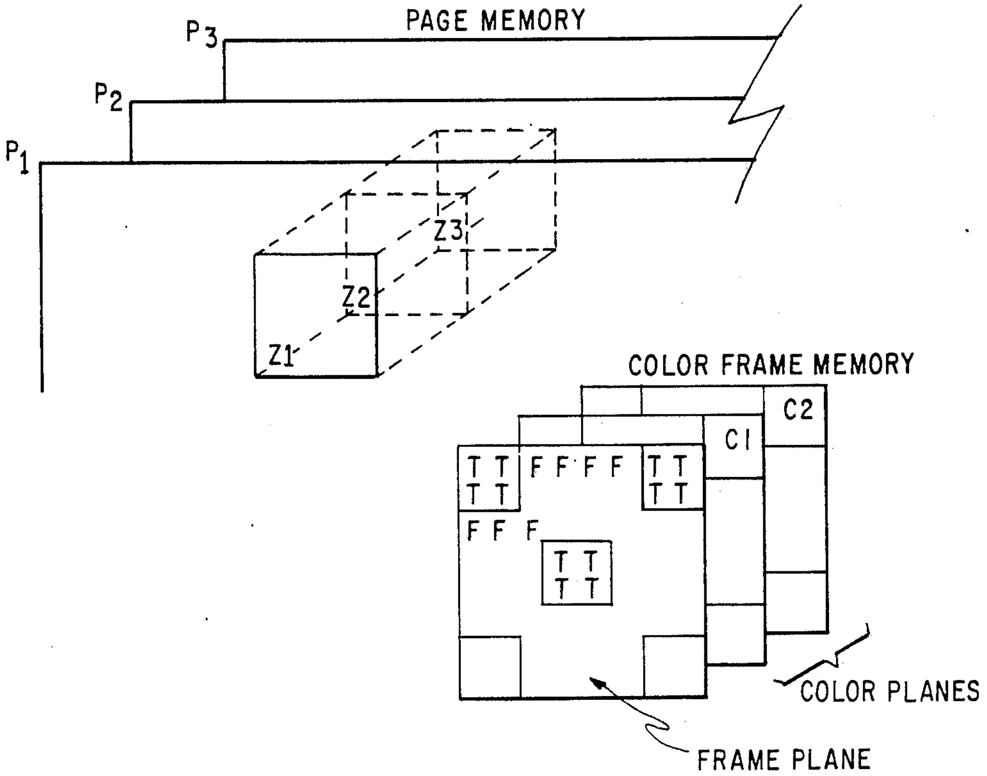
FIGS. 20 and 21A-21D illustrate the principle of superposition of the contents of several zones of the memory.

Zone superposition replaces a portion of the page memory by a multicolor form in another memory zone. The page memory, FIG. 20, is in a number of planes greater than or equal to the number of color planes of the form to be superposed. The superposition can be effected by different methods. The method described here as an example uses a form plane containing "1" bits, indicating that a color is in the color planes. The "0" bits in the form plane indicate transparence. In transparent zones, the contents of the page memory are not changed.

Figures 21A, 21B, 21C, 21D:
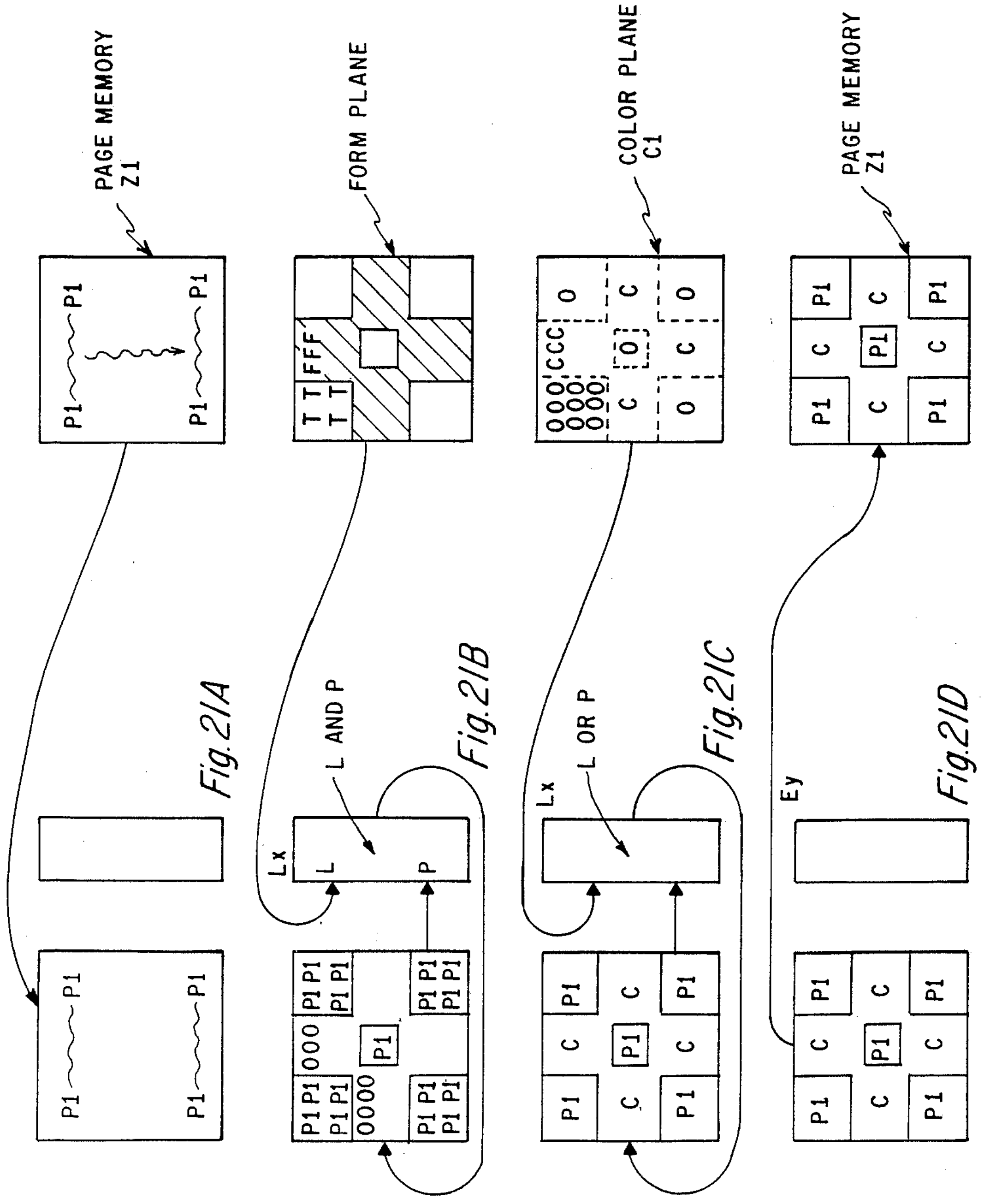

It is assumed that the contents of color planes C1 and C2 are to be transferred o zones Z1 and Z2 of planes P1 and P2, the form having no color in plane 3. The transfer is described in FIG. 21 and is repeated for the two planes P1 and P2. Plane P3 has no color information, and the form bits F are replaced by "zeroes".

The superposition of colors in plane P1 is executed in 4 steps, with the principles set forth above.

A. The contents of zone Z1 are transferred to the point processor by path LY. At the end of the cycle, theprocessor contains at the maximum the plane P1 characteristics of 16 lines having 16 points from plane P1.

B. The following step consists in superposing the form in the point processor, the form plane bits F=1 being represented by "0's" in the point processor. The form plane zero bits do not change the point processor contents.

The form plane is read by path LX, the logic unit effecting the function "NOT" - L - "AND" - P on the point processor and form plane words having the same relative positions. The operation result is placed in the point processor. At the end of the cycle, the point processor has "0's"at the form F bits, and the plane Z1 contents at the form position T.

C. The first color plane C1 is superposed on the contents of the point processor by an "or" function on the color plane words from the access path or LX and the contents of the point processor. At the end of the cycle, the F parts of the form contain the color bits C1, and the T parts are not changed.

D. The last step consists in transfers the contents of the point processor to zone Z1 over path Ey.

The same operation is effected for plan P2, while step C is jumped in the plane P3 composition.

Figure 22:
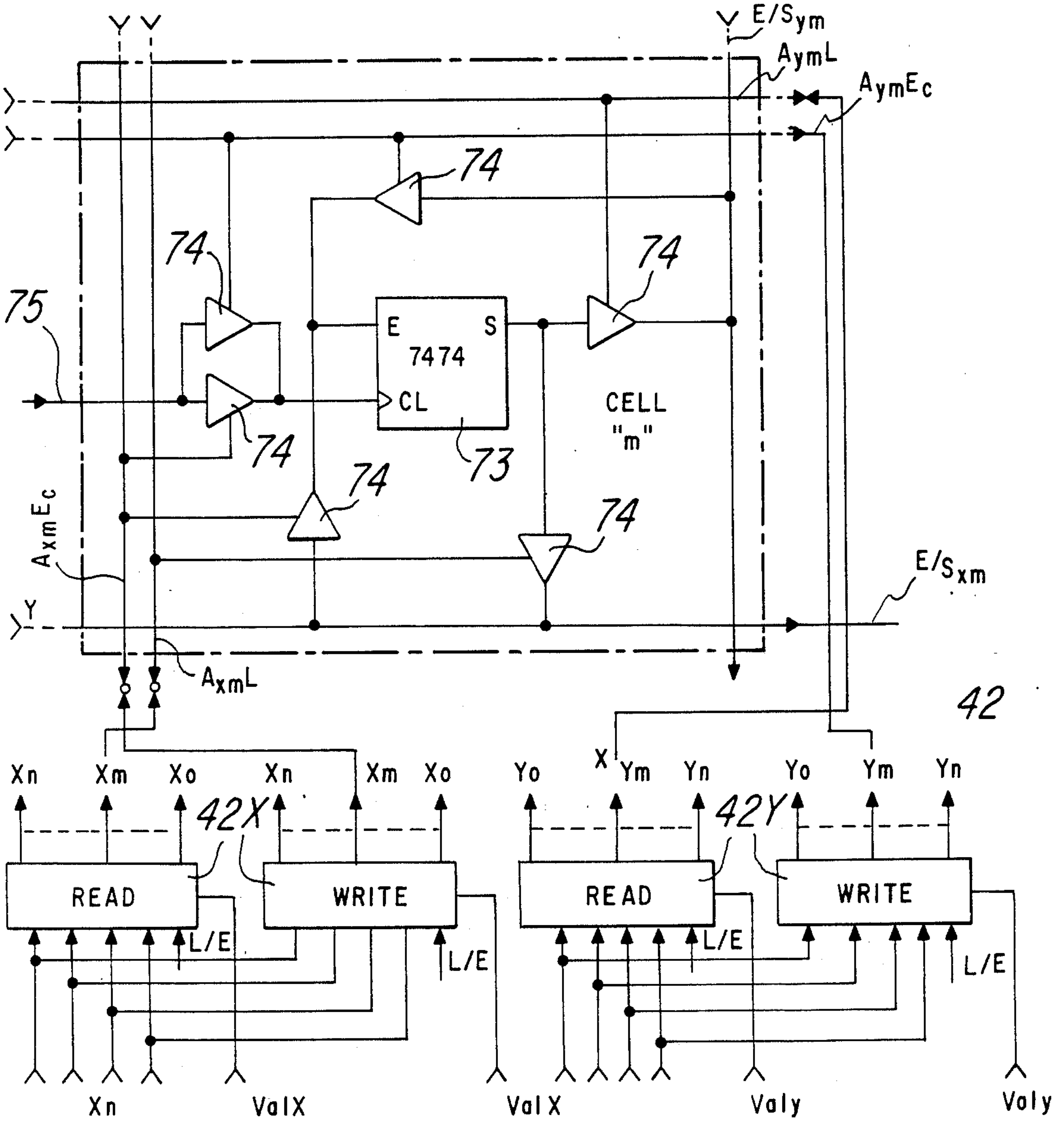
FIG. 22 is a schematic of a cell of the memory network of the point processor.
Figure 23:
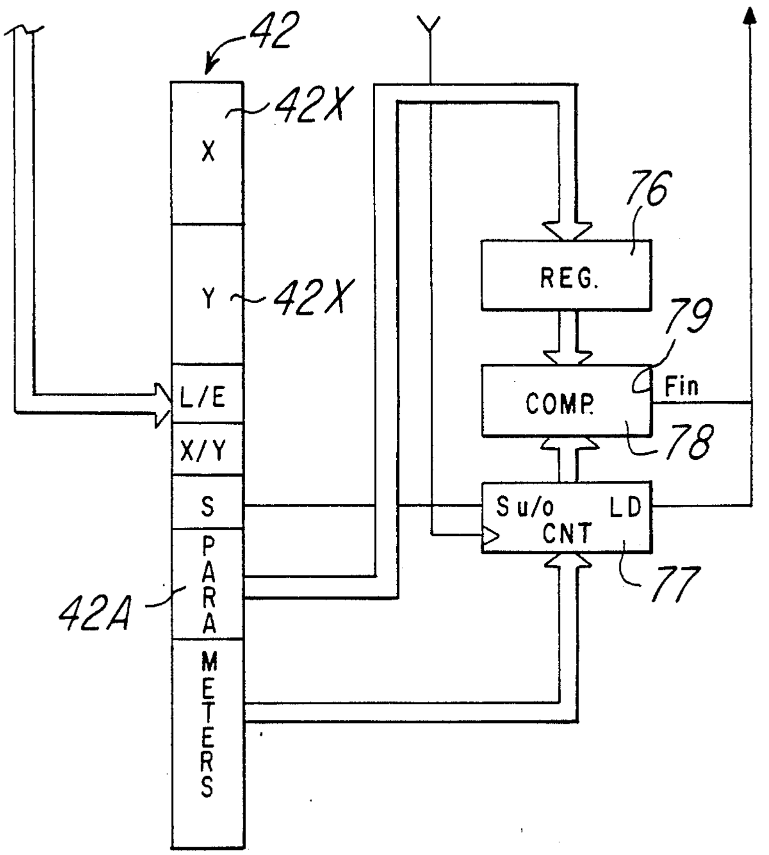
FIG. 23 is a simplified schematic of a control unit utilized with the point processor.

FIG. 22 shows, as an example, a memory cell M embodiment of network 33 in a hard wired version. Those skilled in that art will understand that such a network can also be in integrated circuit form.

The basic element of each cell end is a D-type flip-flop 73, for example that sold under n 7474 by the applicant. This flip-flop includes input terminal E, output terminal S, and clock terminal C1.

The inputs are selectively connected by gates 74 to lines AxmEc, AxmL, AymEc, and AymL for addressing, and to lines E/Sxm and E/Sym for data extraction and loading. The addressing lines are connected to control unit 42, FIG. 7, of which a part is shown in the figures. These are four multiplex sections designated in FIG. 7 by 42X and 42Y.

The transfer of the data is controlled by signal CAS on line 75.

As indicated above, the addresses at which the data is located in network 33 can be increased or decreased between two "ends" or limits which are fixed in advance, the distance between these limits being the number of words in the block. For example, if five word blocks are to be successively processed, the words can be arranged from address Y5 to address Y9, increasing direction, or from address Y11 to address Y7, decreasing direction, any other value n and any other number of words, up to 16, can, of course, also be used. It is to be noted that these parameters can vary from one word group of to the following, all of this being a function of the image manipulation to be effected.

To determine addressing values or limits during the processing of each word block, "parameter" circuits 42*a* are used, which circuits can be loaded in advance of the processing of the block words from the central unit 1.

Circuit 42 is associated with an arrangement of register 76, counter 77, and comparator 78.

The equal output 79 of comparator 78 is connected to state register 19, FIG. 2*a*, to signal to this latter that the end of the address progression has been reached.

What is claimed is:

1. An image processing system, comprising:

a composite memory, for storing a bit-mapped representation of a displayable image; and a video processor for performing data processing instructions, and for controlling the display of the image stored in said composite memory, said video processor comprising:

an address processor, connected to said composite memory, for addressing locations in said composite memory from which data is to be read or to which data is to be written, and for performing data processing instructions;

a memory bus, connected to said composite memory, for communicating data to and from said composite memory;

a point processor, comprising:

an array of memory cells arranged in rows and columns;

row accessing means, for accessing a row in said array responsive to a row address signal;

column accessing means, for accessing a column in said array responsive to a column address signal;

row input/output means, connected to said memory bus, for communicating data between said memory bus and a row of said array accessed by said row accessing means;

column input/output means, connected to said memory bus, for communicating data between said memory bus and a column of said array accessed by said column accessing means; and processing memory control logic, connected to said address processor, comprising:

first and second row address limit registers for storing row address values;

first and second column address limit registers, for storing column address values; and control logic, connected to said row and column address limit registers, to said row and column accessing means, and to said row and column input/output means, for enabling either said row accessing means or said column accessing means, and for reading and writing data between accessed rows and columns of said array and said memory bus, responsive to instructions from said address processor; and a display processor, connected to said memory bus, for receiving image data thereupon and having an output for presenting said image data in a form displayable by a video display device.

2. The image processing system of claim 1, wherein said processing memory control logic further comprises:

direction control means, connected to said address processor and to said control logic, for controlling whether said control logic accesses said array in the order beginning with the first row or column address limit register to the second row or column address limit register, or beginning with the second row or column address limit register to the first row or column address limit register, the selection between row or column access corresponding to instructions from said video processor.

3. The image processing system of claim 1, wherein said row input/output means comprises:

a row local bus, connected to said array; and a row input/output register for communicating data between said row local bus and said memory bus, responsive to signals from said address processor;

wherein said column input/output means comprises:

a column local bus, connected to said array; and a column input/output register for communicating data between said column local bus and said memory bus, responsive to signals from said address processor.

4. The image processing system of claim 3, wherein said row input/output means further comprises:

a row read bus, connected to said array, for receiving the contents of the accessed row of said array responsive to a row read instruction from said address processor;

a row write bus, connected to said row local bus and to said array, for writing data on said row local bus to the accessed row of said array responsive to a row write instruction from said address processor; and a logic unit, connected to said row read bus and to said row local bus, for performing a logical operation on the data on said row read bus and presenting the results on said row local bus to be written into said array via said row write bus.

5. The image processing system of claim 4, wherein said logic unit is also for performing a logical operation on the data on said row read bus in combination with data on said row local bus, and for presenting the results of said logical operation on said row local bus to be written into said array via said row write bus.

* * * * *